(12) United States Patent
Niccum

(10) Patent No.: US 8,251,227 B2
(45) Date of Patent: Aug. 28, 2012

(54) METHODS AND APPARATUS FOR SEPARATING PARTICULATES FROM A PARTICULATE-FLUID MIXTURE

(75) Inventor: Phillip K. Niccum, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 252 days.

(21) Appl. No.: 12/762,009

(22) Filed: Apr. 16, 2010

(65) Prior Publication Data
US 2011/0253600 A1  Oct. 20, 2011

(51) Int. Cl.
*B07B 4/00* (2006.01)
(52) U.S. Cl. ............ 209/133; 55/434.1; 208/113; 95/56
(58) Field of Classification Search ................... 209/133, 209/134, 719
See application file for complete search history.

(56) References Cited

U.S. PATENT DOCUMENTS

| | | | |
|---|---|---|---|
| 3,273,320 A * | 9/1966 | Delaune et al. ............. | 55/434.1 |
| 3,327,456 A | 6/1967 | Guber, Jr. et al. | |
| 4,125,385 A * | 11/1978 | Rado et al. .................. | 55/434.4 |
| 4,364,905 A * | 12/1982 | Fahrig et al. .................. | 422/144 |
| 4,486,207 A * | 12/1984 | Baillie ............................. | 55/455 |
| 4,687,497 A | 8/1987 | Owen et al. | |
| 4,719,014 A * | 1/1988 | Carroll ....................... | 210/512.1 |
| 4,820,404 A | 4/1989 | Owen | |
| 5,376,339 A | 12/1994 | Castagnos, Jr. et al. | |
| 6,267,803 B1 * | 7/2001 | Escobar et al. .................. | 95/271 |
| 6,361,576 B1 | 3/2002 | Andriola | |
| 7,128,827 B2 | 10/2006 | Tallman et al. | |
| 7,182,803 B2 * | 2/2007 | Stewart et al. .................. | 95/269 |
| 7,318,849 B2 * | 1/2008 | Betting et al. .................. | 55/396 |
| 7,491,315 B2 | 2/2009 | Eng et al. | |
| 2006/0049082 A1 | 3/2006 | Niccum et al. | |
| 2010/0005960 A1 * | 1/2010 | Noda ............................... | 95/56 |
| 2010/0025295 A1 | 2/2010 | Mehlberg | |
| 2010/0025305 A1 | 2/2010 | Mehlberg | |

FOREIGN PATENT DOCUMENTS
EP  0 094 098  11/1983
* cited by examiner

*Primary Examiner* — Terrell Matthews
(74) *Attorney, Agent, or Firm* — KBR IP Legal Dept.

(57) ABSTRACT

Methods and apparatus for separating particulates from a fluid are provided. The apparatus can include a separation section having at least one wall, a first end, a second end, and an inner metal surface exposed to an internal volume of the separation section. The apparatus can also include a fluid discharge outlet in fluid communication with the internal volume at the first end. The apparatus can also include a particulate discharge outlet in fluid communication with the internal volume at the second end. The apparatus can also include an inlet in fluid communication with the internal volume. The inlet can be disposed intermediate the first end and the second end.

26 Claims, 6 Drawing Sheets

METHODS AND APPARATUS FOR SEPARATING PARTICULATES FROM A PARTICULATE-FLUID MIXTURE

BACKGROUND OF THE INVENTION

1. Field of the Invention

Embodiments of the present invention generally relate to methods and apparatus for separating particulates from a particulate-fluid mixture. More particularly, embodiments of the present invention relate to methods and apparatus for separating catalyst particulates from a reactor effluent.

2. Description of the Related Art

One approach to separating particulates from a particulate-fluid mixture utilizes a cyclone separator (or simply, "cyclone"). Introduction of the particulate-fluid mixture to the cyclone separator induces centripetal acceleration to the mixture, thereby forcing the higher density particulates outward toward the walls of the cyclone separator to provide a gas in the middle of the cyclone having reduced particulate content and the separated particulates along the separator walls. Fluid catalytic cracking ("FCC") is a process that frequently uses cyclone separators to separate catalyst particulates from a product effluent containing gas and catalyst particulates entrained therein.

Current cyclone separator designs require a refractory lining on the inner surface of the cyclone separator. Without the refractory lining, catalyst particulates impinging on the surface of the cyclone erode the walls of the cyclone, which causes premature failure. However, current refractory linings often prematurely fail, especially at high temperatures, due to various factors, which include the growth of coke between the refractory lining and the cyclone's walls, within cracks or other imperfections of the refractory lining's surface, and/or between adjoining pieces or sheets of refractory material. After a sufficient amount of coke has formed, the refractory lining will break, chip, crack, and eventually portions or all of the refractory lining can completely detach from the cyclone walls rendering operation of the cyclone impossible.

There is a need, therefore, for more reliable methods and apparatus for separating particulates from a particulate-fluid mixture.

BRIEF DESCRIPTION OF THE DRAWINGS

So that the manner in which the recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Methods and apparatus for separating particulates from a fluid are provided. The apparatus can include a separation section having at least one wall, a first end, a second end, and an inner metal surface exposed to an internal volume of the separation section. The apparatus can also include a fluid discharge outlet in fluid communication with the internal volume at the first end. The apparatus can also include a particulate discharge outlet in fluid communication with the internal volume at the second end. The apparatus can also include an inlet in fluid communication with the internal volume. The inlet can be disposed intermediate the first end and the second end.

Figure 1:
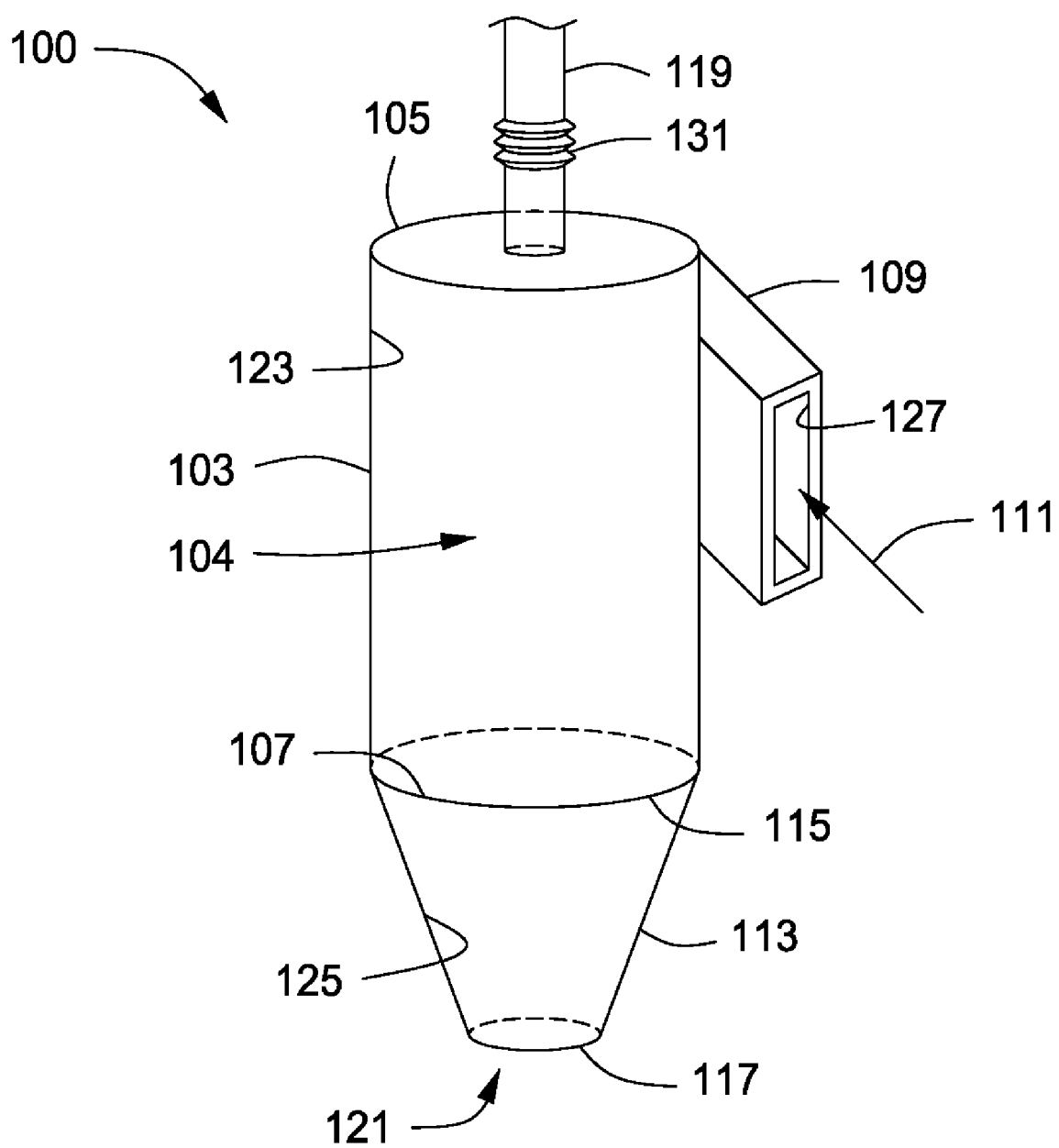
FIG. 1 depicts an isometric view of an illustrative separator, according to one or more embodiments described.

FIG. 1 depicts an isometric view of an illustrative separator 100, according to one or more embodiments. The separator 100 can include a separation or "first" section 103 having a first end 105, a second end 107, and one or more inlets 109 (only one is shown) disposed intermediate the first end 105 and the second end 107. In one or more embodiments, the separator 100 can also include a particulate discharge or "second" section 113 disposed on the second end 107 of the first section 103 and having a first end 115 and a second end 117. One or more fluid outlets 119 can be disposed about the first end 105 of the first section 103 and one or more particulate outlets 121 can be disposed about the second end 117 of the second section 113.

Any number of inlets 109 and outlets 119, 121 can be in fluid communication with an internal volume 104 of the separator 100. As illustrated, one inlet 109 and two outlets 119, 121 are depicted in fluid communication with the internal volume 104. In one or more embodiments, the inlet 109 can be tangentially disposed on a sidewall of the first section 103 and in fluid communication with the internal volume 104. In one or more embodiments, a portion of an outlet 119, 121, an inlet 109, or any combination of outlets 119, 121 and/or inlets 109 can include a conduit or tube that extends into the internal volume 104. For example, a portion of the outlet 119 can be in fluid communication with a conduit (not shown) that extends into the internal volume 104. In one or more embodiments, the one or more inlets 109 and/or outlets 119, 121 can include thermal expansion joints 131 (one is shown disposed on the outlet 119), which can absorb structural strains imposed by thermal expansion of components. A particulate-fluid mixture 111 whose flow is indicated by the arrow can be introduced to the internal volume 104, which can be separated to provide a particulate-lean fluid via outlet 119 and particulates via outlet 121.

The first section 103, second section 113, inlet 109, or any combination thereof can be made of any suitable metal. Illustrative metals can include, but are not limited to, cobalt, chromium, tungsten, carbon, silicon, iron, manganese, molybdenum, vanadium, nickel, boron, phosphorous, sulfur, titanium, aluminum, copper, tungsten, alloys thereof, or any combination thereof. In one or more embodiments, the first section 103, second section 113, inlet 109, or any combination thereof can be made of steel such as stainless steels, carbon steels, tool steels, alloy steels, or any combination thereof. Illustrative steels can include, but are not limited to, A387 Grade 11 low chrome steel, 304 stainless steel, and 347 stainless steel. The separator 100 can be made from one or more metals having a grain size of less than about 100 μm, less than about 75 μm, less than about 50 μm, less than about 25 μm, less than about 10 μm, less than about 5 μm, less than about 4 μm, less than about 3 μm, or less than about 2 μm.

The first section 103 can include an inner surface 123, the second section 113 can include an inner surface 125, and the inlet 109 can include an inner surface 127. As such, at least a portion of the inner surfaces 123, 125, and/or 127 can be metal. The inner surfaces 123, 125, and 127 can all be metal and free of any ceramic or other non-metal linings or coatings. In at least one specific embodiment, the entire surface area of the inner surfaces 123, 125, and 127 can be metal and completely free of any ceramic or other non-metal material disposed thereon. In at least one specific embodiment, at least one of the inner surfaces 123, 125, and/or 127 can be solid metal, e.g., free of any intentionally formed holes, indentations, apertures, grooves, recesses, and the like. In other words, at least one of the inner surfaces 123, 125, and/or 127 can be smooth or continuous surfaces. In at least one specific embodiment, the inner surfaces 123, 125 can be metal and the inner surface 127 can include a ceramic lining disposed thereon and/or thereabout. In at least one other specific embodiment, the inner surface 123 can be metal and the inner surfaces 125, 127 can include a ceramic lining disposed thereon and/or thereabout. In at least one other specific embodiment, the inner surfaces 123 and 127 can be metal and the inner surface 125 can include a ceramic lining disposed thereon and/or thereabout. The inner surfaces 123, 125, and/or 127 can resist erosion, chipping, cracking, pitting, and other surface damage caused by particulates impinging upon the surface(s) thereof.

In one or more embodiments, the separator 100 made from one or more metals can further include a metal plate or metal foil (not shown), for example, bonded, welded, bolted, screwed, or otherwise attached to an inner wall of the of the first section 103, the second section 113, and/or the inlet 109, which can provide at least a portion of the inner surfaces 123, 125, 127, respectively. For example, a metal plate or foil can be welded to an inner surface of a metal first section 103. The metal plate or foil can be of the same or a different composition as the metal used to make the first section 103. The metal plate or foil can provide additional thickness to the wall of the first section 103 and/or additional properties, such as an increased hardness, increased melting point, increased thermal conductivity, or any combination thereof relative to the metal used to make the first section 103. In at least one specific embodiment, a separator including one or more metal plates of foil disposed on an inner wall of the first section 103, second section 113, and/or the inlet 109 can be attached thereto such that no cracks, crevices, or other openings are present.

A metal plate or foil, for example, secured to the inner walls of the first section 103 can be partially or completely disposed about the inner walls thereof, thereby providing all or a portion of the inner surface 123. In another example, a metal plate disposed on the inner walls of the first section 103 can cover a low of about 10%, about 15%, about 20%, or about 25% to a high of about 80%, about 90%, about 95%, or about 100% of the surface area of the inner surfaces 123, 125, and/or 127. In still another example, a metal plate disposed on the inner surface of the first section 103 can be disposed about the portion of the inner surface 123 that receives the particulate-fluid mixture 111 or a substantial portion of the particulate-fluid mixture 111 introduced via inlet 109 to the first section 103. The metal plate can provide or cover the portion of the inner surface 123 located between a first and a second end of an opening of the inlet 109 thereby providing a band or ring of additional metal disposed about the inner wall of the first separation section 103.

In one or more embodiments, the separator 100 can be made from a steel alloy having from about 0.8 percent by weight ("wt %") to about 1.25 wt % carbon and from about 11 wt % to about 15 wt % manganese. In at least one other specific embodiment, the separator 100 can be made from a cobalt alloy having from about 2 wt % to about 25 wt % nickel, from about 2 wt % to about 2.5 wt % iron, from about 0.4 wt % to about 2.5 wt % carbon, from about 20 wt % to about 35 wt % chromium, from about 0.5 wt % to about 1.5 wt % manganese, from about 0.5 wt % to about 1.5 wt % silicon, and from about 5 wt % to about 25 wt % tungsten. Commercially available metal alloys suitable for making the separator 100 can include, but are not limited to, STELLITE® (Delloro Stellite), HASTELLOY® (Haynes International, Inc.), Manganol, MANGALLOY® (Ford Steel Company), INCOLOY (Huntington Alloys Corporation) and/or Hadfield.

In one or more embodiments, at least a portion of the inner surfaces 123, 125, and/or 127 can be treated to provide treated inner surfaces 123, 125, and/or 127 having increased surface hardness, wear resistance, fatigue strength, and/or tensile strength. For example, at least a portion of the inner surfaces 123, 125, and/or 127 can undergo one or more of carburization, boronization, and nitridization. In at least one specific embodiment, the separator 100 can be heated in the presence of a carbon source to a temperature below the melting point of the inner surfaces 123, 125, and/or 127, but sufficiently high to cause carbon to deposit within the outer layer or surface of the inner surfaces 123, 125, and/or 127 (i.e. that layer or surface exposed to the inner volume 104). Any suitable form of carbon can be used, for example carbon containing gases, liquids, solids, and/or plasmas. Illustrative gases can include, but are not limited to, carbon dioxide, methane, ethane, propane, or the like. In at least one other specific embodiment, the separator 100 can be heated in the presence of a boron source to a sufficient temperature, but below the melting point of the inner surfaces 123, 125, and/or 127, causing boron to diffuse into the surface and form borides with the base material. In yet another specific embodiment, the separator 100 can be heated in the presence of a nitrogen source to a sufficient temperature, but below the melting point of the inner surfaces 123, 125, and/or 127, causing nitrogen to diffuse into the surface and form nitrides with the base material. Any suitable process can be used to nitride the inner surfaces 123, 125, and/or 127. For example, gas nitriding, liquid or salt bath nitriding, and ion or plasma nitriding can be used. In at least one other specific embodiment, the separator 100 can under-go both carburization and nitridization ("carbonitriding") in which both carbon and nitrogen are diffused into the inner surfaces 123, 125, and/or 127.

In one or more embodiments, the inner surfaces 123, 125, and/or 127 can be treated, e.g. carburized, during operation of the separator 100. For example, the separator 100 can be in fluid communication with an FCC riser (not shown) that provides a high temperature mixture of catalyst particulates and hydrocarbon gases ("FCC effluent") as the particulate-fluid mixture 111, which can be introduced into separator 100 via inlet 109. A portion of the carbon from the hydrocarbons in the FCC effluent can diffuse into the inner surfaces 123, 125, and/or 127 to provide treated inner surfaces. Similarly, nitridization, boronization, carbonitridization, or other surface treating can be carried out during operation of the separator 100. Depending on the particular metal and/or process conditions, the depth or thickness of the treated layer of a treated inner surface, e.g. the inner surface 123, can range from a low of about 5 μm, about 100 μm, or about 500 μm to a high of about 1 mm, about 2 mm, about 3 mm, about 4 mm, or about 5 mm.

In one or more embodiments, the metal or metal alloy used to make at least a portion of the separator 100 can have any combination of desirable properties. Desirable properties of the metal or metal or metal alloy used to make at least a portion of the separator 100 can include, but are not limited to, specific heat capacity, melting point, thermal conductivity, hardness, toughness, volumetric specific heat, thermal diffusivity, tensile strength, or any combination thereof. In one or more embodiments, the metal or metal alloy can have a specific heat capacity ranging from a low of about 300 J/kg K, about 350 J/kg K, or about 400 J/kg K to a high of about 450 J/kg K, about 500 J/kg K, or about 550 J/kg K. In one or more embodiments, the metal or metal alloy can have a melting point ranging from a low of about 800° C., about 900° C., or about 1,000° C. to a high of about 1,250° C., about 1,350° C., about 1,450° C., about 1,500° C., or about 1,600° C. For example, the melting point of the metal or metal alloy can range from about 1,100° C. to about 1,500° C., about 1,250° C. to about 1,450° C., or from about 1,350° C. to about 1,475° C. In one or more embodiments, the metal or metal alloy can have a thermal conductivity ranging from a low of about 8.5 watts/m K, about 14 watts/m K, or about 20 watts/m K to a high of about 30 watts/m K, about 40 watts/m K, or about 50 watts/m K. In one or more embodiments, the metal or metal alloy can have a hardness ranging from a low of about 150 ("Brinell Hardness" or "HB"), about 175 HB, or about 200 HB to a high of about 300 HB, about 350 HB, or about 400 FIB. In one or more embodiments, the metal or metal alloy can have a Charpy toughness ranging from a low of about 5 ft-lb, about 25 ft-lbs, or about 50 ft-lbs to a high of about 100 ft-lbs, about 200 ft-lbs, or about 300 ft-lbs. For example, the metal or metal alloy can have a Charpy toughness of from about 60 ft-lbs to about 275 ft-lbs, about 90 ft-lbs to about 150 ft-lbs, or about 100 ft-lbs to about 120 ft-lbs. In one or more embodiments, the metal or metal alloy can have a thermal conductivity value of from about 15 watts/m K to about 50 watts/m K, a hardness value of from about 150 HB to about 400 HB, and a melting point of from about 1,275° C. to about 1,450° C. Illustrative metal alloys and properties thereof that can be used to make at least a portion of the separator 100, are shown in Table 1.

TABLE 1

|  | A387 Grade 11 Low Chrome Steel | 304 Stainless Steel | 347 Stainless Steel | Incoloy 800 | Low Carbon Steel, Annealed | SA 516-70 Annealed | Hastelloy C | Stellite 6 |
|---|---|---|---|---|---|---|---|---|
| Melting Point (° F.) | 2610 | 2600 | 2575 | 2570 | 2550 | 2500 | 2350 | 2330 |
| Thermal Conductivity (btu in/ft2 hr ° F.) | 324 | 113 | 110 | 85 | 360 | 345 | 61 | 103 |
| Specific Heat Capacity (btu/lb ° F.) | 0.105 | 0.120 | 0.120 | 0.120 | 0.107 | 0.110 | 0.092 | 0.101 |
| Volumetric Specific Heat (btu/ft3 ° F.) | 51.2 | 60.0 | 59.2 | 59.9 | 52.4 | 54.1 | 44.7 | 53.2 |
| Thermal Diffusivity (ft2/hr) | 0.527 | 0.157 | 0.155 | 0.118 | 0.573 | 0.531 | 0.114 | 0.161 |
| Charpy Toughness (ft-lbs) | 54 | 110 | 110 | 90 | 50 | 37 | 263 | 9 |
| Tensile Strength at 1200° F. (psi) | 33,000 | 44,000 | 85,000 | 93,000 | 17,500 | 17,000 | 60,000 | — |
| Brinell Hardness Average | 180 | 280 | 230 | 336 | 155 | 164 | 414 | 400 |
| Brinell Hardness Range | 150-210 | 160-400 | 160-300 | 138-198 | 130-179 | 140-187 | 199-215 | 350-450 |
| Carburization Susceptibility (1 = high, 8 = low) | 3 | 4 | 5 | 6 | 1 | 2 | 7 | 8 |

In at least one specific embodiment, the inner surfaces 123, 125, and/or 127 can be 304 stainless steel. In at least one other specific embodiment, the inner surfaces 123, 125, and 127 can all be 304 stainless steel. Not wishing to be bound by theory, it is believed that the combination of physical properties of 304 stainless steel provides a metal that exhibits a wide range of desirable attributes. For example, the combination of melting point, specific heat capacity, and specific gravity can provide a surface that can absorb a desirable amount of energy from a particle impacting thereon without melting at the point of impact. Not wishing to be bound by theory, it is believed that repeated microscopic surface melting at the points of particle impact are one mechanism responsible for what is generally referred to as metal erosion in the FCC industry. The volumetric specific heat is a combination of the properties of specific heat capacity and specific gravity that can provide an indication of how much energy will be absorbed in a given volume of material for a given temperature rise. The higher the volumetric specific heat value indicates that the temperature rise in the given volume will be less for a defined input of energy. Thermal diffusivity is a combination of the properties of thermal conductivity, specific heat capacity, and specific gravity, into a term that indicates the rate a at which a material will return to the temperature of its surroundings after a localized temperature change has occurred. Higher values of all of these properties, namely volumetric specific heat and thermal diffusivity, are generally considered positive with respect to minimizing the microscopic melting phenomenon believed to be, at least in part, responsible for erosion in FCC services.

The 304 stainless steel has a Charpy Toughness of about 110 ft-lbs and a tensile strength of about 44,000 psi at a temperature of 1,200° F. that can reduce or minimize chipping of the material at the point of particle impact. The surface of 304 stainless steel has an average Brinell Hardness of about 280, which can provide a surface resistant to scratching. The surface hardness of 304 stainless steel can also improve deflection of a particle, thereby minimizing the absorption of damaging thermal energy by the surface. T The 304 stainless steel has a moderate propensity for carburization in a high temperature reducing environment. The tendency for 304 stainless steel to undergo carburization can promote surface hardening of the surface during operation or use. For example, separator 100 used in a process that involves high temperature and/or a reducing environment that includes inner surfaces made of metal, for example 304 stainless steel, can be subjected to accelerated carburization and/or resist damage as compared to a separator having ceramic linings as an inner surface.

In one or more embodiments, the walls of the inlet 109, the first section 103, and/or the second section 105 can have a thickness ranging from a low of about 1 cm, about 2.5 cm, or about 4 cm to a high of about 5 cm, about 10 cm, or about 20 cm. The thickness of the walls of the first section 103, the second section 113, and the inlet 109 can be the same or different with respect to one another. For example, the wall(s) of first section 103 can be thicker than the wall(s) of the second section 113.

The particulate-fluid mixture 111 can be at an elevated temperature, for example 550° C. or more, which can further accelerate erosion and other wear of the inner surfaces 123, 125, and/or 127 due to the particulates impinging thereon. The particulate-fluid mixture 111 can be at a temperature ranging from a low of about 500° C., about 550° C., or about 600° C. to a high of about 650° C., about 680° C., about 700° C., or about 750° C. For example, the particulate-fluid mixture 111 can be at a temperature of from about 550° C. to about 700° C., about 570° C. to about 680° C., or from about 580 to about 700° C. The separator 100 can be operated at ranging from a low of about 550° C., about 560° C., about 570° C., or about 580° C. to a high of about 610° C., about 630° C., about 660° C., about 680° C., about 700° C., about 725° C., or about 750° C. For example, the separator 100 can be operated at a temperature of from about 550° C. to about 750° C., about 550° C. to about 700° C., about 580° C. to about 690° C., about 580° C. to about 680° C., or about 600° C. to about 680° C. In one or more embodiments, the inner surfaces 123, 125, and/or 127 can be at the same or about the same temperature at which the separator 100 can be operated at. For example, the inner surfaces 123, 125, and/or 127 can be at a temperature ranging from a low of about 550° C., about 560° C., about 570° C., or about 580° C. to a high of about 610° C., about 630° C., about 660° C., about 680° C. about 700° C., about 725° C., or about 750° C.

The particulate-fluid mixture 111 can be introduced via inlet 109 to the internal volume 104 of the first section at a velocity ranging from a low of about 9 m/s to a high of about 30 m/s. For example, the velocity of the particulate-fluid mixture 111 introduced via the inlet 109 can be about 12 m/s, about 14 m/s, about 15 m/s, about 17 m/s, or about 18 m/s. The particulate-fluid mixture via line 111 can be introduced via inlet 109 at a rate ranging from a low of about 2 m$^3$/min, about 5 m$^3$/min, or about 10 m$^3$/min to a high of about 20,000 m$^3$/min, about 25,000 m$^3$/min, or about 30,000 m$^3$/min. The separator 100 can have an operational lifespan ranging from a low of about 2 years, about 3 years, or about 4 years to a high of about 5 years, about 10 years, about 15 years, or about 20 years.

The first section 103, the second section 113, and/or the inlet 109 can have constant or variable cross-sections. For example, the cross-section of the first section 103 can be circular having a constant diameter to provide a cylindrical first section 103. The cross section of the second section 113 can be circular having a variable diameter to provide a conical or frustoconical second section 113. As shown, the cross-section of the inlet 109 is rectangular. However, the inlet 109 can have any desirable cross-sectional shape such as triangular, elliptical, circular, and the like. In another example, the diameter of the second section 113 can be constant to provide a cylindrical second section 113. In one or more embodiments, the second section 113 can be eliminated with the particulate outlet 121 located at the second end 107 of the first section 103. In one or more embodiments, the separator 100 can be a self-stripping separator having a first section 103 to separate the particulates from the carrier fluid and a second section 113 for stripping residual carrier fluid from the separated particulates. An illustrative self-stripping separator can be as discussed and described in U.S. Patent Application Publication No. 2006/0049082, which is incorporated by reference herein.

The separator 100 can be used in a new facility or plant operation for separating catalyst particulates from a carrier fluid, for example. In one or more embodiments, the separator 100 can be used to retrofit an existing separator in an already constructed and/or operating facility or plant. An existing separator having a ceramic lining, for example, can be removed from a process system, such as an FCC system (FIG. 2) and replaced with a separator 100. In another example, an existing separator having a ceramic lining can be modified by removing the ceramic lining therefrom. In still another example, an existing separator having a ceramic lining can be modified by removing the ceramic lining therefrom and attaching a metal plate or foil to the inner surfaces thereof to provide a modified separator having metal surfaces exposed to the internal volume thereof.

Figure 2:
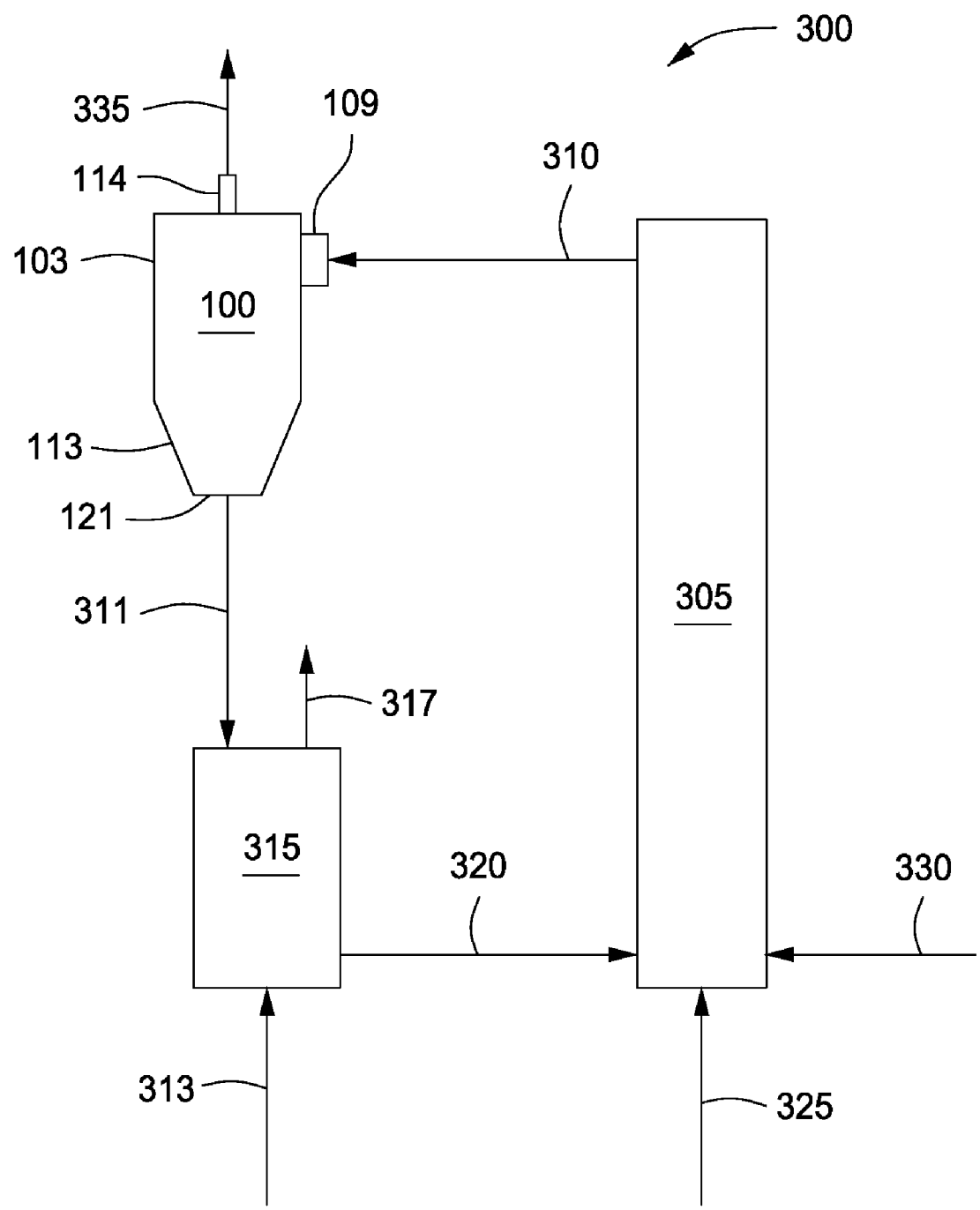
FIG. 2 depicts an illustrative fluid catalytic cracking system according to one or more embodiments described.

FIG. 2 depicts an illustrative fluid catalytic cracking system 300, according to one or more embodiments. The FCC system 300 can include one or more reaction risers or risers 305, ducts 310, separators 100, and regenerators 315. In one or more embodiments, the one or more risers 305, ducts 310, and/or regenerators 315 can include inner surfaces similar to the inner surfaces 123, 125, and 127 discussed and described above with reference to FIG. 1. As such, all or any portion of the inner surfaces of the one or more risers 305, ducts 310, and/or regenerators 315 can also be metal and free of non-metal coatings or linings, for example ceramic linings.

Steam via line 325, one or more hydrocarbons via line 330, and one or more catalysts (in particulate or other form) via line 320 can be introduced to the one or more risers 305, forming a fluidized mixture ("reaction mixture") therein. The steam via line 325 and the catalyst via line 320 can be introduced separately to the riser 305 as shown in FIG. 2, or the steam and the catalyst can be mixed and introduced together as a mixture to the riser 305.

Heat in the riser 305 provided by the steam via line 325 and the catalyst via line 320 can vaporize at least a portion of the hydrocarbon feed introduced via line 330, to provide the reaction mixture therein. Supplemental heat can be provided to the one or more risers 305 using waste heat (not shown) provided from the regenerator 315. Within the riser 305, the hydrocarbons within the reaction mixture can be cracked into one or more hydrocarbons and hydrocarbon by-products to provide a first product mixture via duct 310. At least a portion of the hydrocarbon by-products present in the riser 305 can deposit on the surface of the catalyst particulates, forming coked-catalyst particulates or spent catalyst. Thus, the first product mixture exiting the riser 305 can contain coked-catalyst particulates suspended in gaseous hydrocarbons, hydrocarbon by-products, carbon dust or particulates, steam, and other inerts. As such, the particulate-fluid mixture in duct 310 can be a reduced or reducing environment of gaseous hydrocarbons.

In one or more embodiments, the amount of coke or carbon deposited on the catalyst particulates can range from a low of about 0.01 wt %, about 0.1 wt %, or about 0.5 wt % to a high of about 1 wt %, about 1.5 wt %, or about 2 wt %. In one or more embodiments, the amount of coke deposited on the catalyst particulates can range from about 0.5 wt % to about 1.5 wt %, from about 0.7 wt % to about 1.3 wt %, or from about 0.9 wt % to about 1.1 wt % based on the total weight of the carbon deposits and the catalyst particulates.

The catalyst-to-hydrocarbon weight ratio can range from about 2:1 to about 20:1; from about 3:1 to about 10:1; or from about 4:1 to about 8:1. In one or more embodiments, the riser 305 can be operated at a temperature ranging from a low of about 425° C., about 450° C., about 475° C., or about 500° C. to a high of about 600° C., about 675° C., about 700° C., or about 825° C. The riser 305 can be operated at a temperature ranging from about 300° C. to about 675° C., from about 550° C. to about 700° C., from about 605° C. to about 670° C., or from about 610° C. to about 660° C., from about 580° C. to about 700° C., from about 600° C. to about 680° C., or from about 615° C. to about 650° C. In at least one specific embodiment, the riser 305 can be operated at a temperature of about 605° C., about 615° C., about 625° C., about 630° C., about 640° C., or about 650° C.

The velocity of the reaction mixture flowing through the riser 305 can range from about 3 m/sec to about 27 m/sec, about 6 m/sec to about 25 m/sec, or about 9 m/sec to about 21 m/sec. The residence time of the reaction mixture in the riser 305 can be less than about 20 seconds, less than about 10 seconds, less than about 8 seconds, less than about 4 seconds, or less than about 2 seconds.

The first product mixture can flow, via the duct (or transition line) 310, to the one or more separators 100 where the coked-catalyst particulates and/or other particulates can be separated from the gaseous hydrocarbons, steam, and inerts. The separator 100 can have a larger cross-sectional area than the riser 305 and/or the duct 310, which can reduce the velocity of the first product mixture, allowing the heavier coked-catalyst particulates and/or other particulates to separate from the gaseous hydrocarbons, steam, and inerts. In one or more embodiments, a steam purge (not shown) can be added to the separator 100 to assist in separating the gaseous hydrocarbons from the coked-catalyst particulates, i.e. stripping the gaseous hydrocarbons from the solids. In other words, the separator 100 can be a self-stripping separator.

The gaseous hydrocarbons ("first product") via line 335 can be recovered from the separator 100. Although not shown, in one or more embodiments, the first product in line 335 can be further processed, such as by dehydrating or fractionating to produce one or more finished products including, but not limited to, one or more olefins, paraffins, aromatics, mixtures thereof, derivatives thereof, and/or combinations thereof. For example, the first product via line 335 can be introduced to a quench tower that can quench the first product and separate entrained catalyst particulates therefrom. Entrained catalyst particulates separated from the first product can be recycled back to the riser 305 and/or to the regenerator 315. A suitable FCC system 300 having a quench tower for quenching and separating entrained catalyst particulates from the first product 335 can be as discussed and described in U.S. Pat. No. 7,153,479, which is incorporated by reference here.

In one or more embodiments, the separator 100 can separate about 99%, about 99.5%, about 99.9%, about 99.99%, or about 99.999% of the particulates from the first product mixture via the duct 310. For example, the separator 100 can separate about 99.9% to about 99.997%, about 99.95% to about 99.996%, or about 99.95% to about 99.99% of the particulates from the first product mixture via the duct 310.

The solids, i.e. coked-catalyst particulates, can free fall through the particulate outlet 121 of the separator 100 and can be introduced via line 311 to the regenerator 315. The coked-catalyst particulates introduced via line 311 can be combined with a fluid introduced via line 313 within the regenerator 315 to provide a flue gas via line 317 and regenerated catalyst via line 320. The fluid introduced via line 313 can include one or more oxidants and/or supplemental fuel. Illustrative oxidants can include, but are not limited to, air, oxygen, mixtures of air or oxygen and other gases such as nitrogen, and/or oxygen enriched air. The supplemental fuel can include any combustible material. For example the supplemental fuel can include, but is not limited to, $C_1$ to $C_{20}$ hydrocarbons and/or carbon. The supplemental fuel can be introduced as a liquid, gas, solid, or any combination thereof to the regenerator 315. The one or more oxidants can react with the carbonaceous matter on the coked-catalyst particulates to combust or otherwise burn the carbon ("coke") off the surface of the catalyst particulate. Should supplemental fuel be introduced, the one or more oxidants can react with the supplemental fuel to combust the supplemental fuel and generate heat. The removal of the coke from the surface of the catalyst particulate can re-expose the reactive surfaces of the catalyst particulates, thereby "regenerating" the catalyst particulate and permitting reuse thereof. Combustion by-products, such as carbon monoxide, nitrogen oxides, nitrogen oxide precursors, and carbon dioxide, can be removed from the regenerator 315 as the waste or flue gas via line 317. The regenerated catalyst particulates can be recovered via line 320, which can be recycled to the riser 305. In one or more embodiments, fresh, unused, catalyst can be added (not shown) to the regenerator 315, the regenerated catalyst in line 320, and/or to the riser 305.

The regenerator 315 can be operated in full burn mode, partial burn mode, or anywhere in between. Operating the regenerator 315 in a full burn mode can provide the waste gas or flue gas via line 317 which can contain a larger amount of nitrogen oxides ("NOx") and NOx precursors and a decreased amount of carbon monoxide (CO) relative to the partial burn mode. Operating the regenerator 315 in a partial burn mode can provide the waste gas or flue gas via line 317 which can contain a larger amount of CO and a lesser amount of NOx and NOx precursors relative to the full burn mode. Operating the regenerator 315 in between the two extremes of full burn and partial burn can provide the waste or flue gas via line 317 that contains less NOx and NOx precursors and more CO when compared to the full burn mode. In one or more embodiments, the NOx gases can include, but are not limited to, NO, $NO_2$, and $N_2O$. In one or more embodiments, the NOx precursors can include, but are not limited to, HCN, $NH_3$, CN, and HNO.

In one or more embodiments, the flue gas via line 317 can be introduced to one or more optional CO boilers (not shown) to remove additional CO. The one or more CO boilers can be any type of CO boiler, which are well-known. The CO boiler can be operated in multiple stages to reduce the flame temperature occurring in any one stage and limit NOx formation in an oxidizing atmosphere. Low NOx burners can also be used to burn the fuel gas (not shown) which may be needed to keep the CO boiler lit. In one or more embodiments, ammonia or an ammonia precursor such as urea can be introduced (not shown) to the optional CO boiler to reduce NOx emissions even further. These materials can react quickly with NOx and NOx precursors to reduce it to nitrogen. Additional details for conventional FCC processes and flue gas treatment can be as discussed and described in U.S. Pat. No. 5,268,089, which is incorporated by reference herein.

In one or more embodiments, at least a portion of the flue gas via line 317 and/or flue gas from the one or more optional CO boilers can be vented to the atmosphere and/or sent to a heat recovery unit (not shown) and then vented to the atmosphere, sequestered under ground, or otherwise disposed. The one or more optional CO boilers, if used, can reduce the CO content of the flue gas in line 317 by about 5 wt %, about 10 wt %, about 15 wt %, about 20 wt %, about 25 wt %, about 30 wt %, about 35 wt %, about 40 wt %, about 45 wt %, or about 50 wt %. In one or more embodiments, the one or more optional CO boilers can reduce the CO content of the flue gas in line 317 by from about 5 wt % to about 90 wt %; from about 5 wt % to about 75 wt %; from about 5 wt % to about 60 wt %; or from about 5 wt % to about 50 wt %. All CO reductions referred to in this paragraph are on the basis of the weight of the CO in the flue gas alone.

Although not shown, in one or more embodiments, a carbon dioxide ($CO_2$) separation unit can be used to remove at least a portion of the $CO_2$ from the flue gas in line 317. In one or more embodiments, $CO_2$ can be removed for sequestration or reuse, e.g., reuse through enhanced oil recovery.

In one or more embodiments, the one or more optional heat recovery units (not shown) can include any device, system, or combination of systems and/or devices suitable for transferring heat from a fluid at a higher temperature to a fluid at a lower temperature. In one or more embodiments, the heat recovery unit can include, but is not limited to, single or multiple pass heat exchange devices such as shell and tube heat exchangers, plate and frame heat exchangers, spiral heat exchangers, bayonet type heat exchangers, U-tube heat exchangers, and/or any similar system or device.

In one or more embodiments, a fluidized mixture, containing spent catalyst particulates, regenerated catalyst particulates, oxidants, carbon monoxide, carbon dioxide, nitrogen oxides, and/or the one or more fluids introduced via line 313 can be combined within the regenerator 315 with one or more optional doping agents introduced thereto (not shown). The dispersal and deposition of the one or more doping agents on the regenerated catalyst can be enhanced by the high temperature and fluid velocity present in the regenerator 315. In one or more embodiments, the one or more optional doping agents can be mixed with a supplemental fuel, for example natural gas, and introduced (not shown) to the regenerator 315. The use of supplemental fuel can provide additional heat within the regenerator 315, further enhancing the regeneration of the coked-catalyst particulates therein.

In one or more embodiments, the selection of an appropriate doping agent or additive or blend of two or more doping agents or additives can be based, at least in part, upon the composition of the incoming hydrocarbon feed via line 330, and/or desired gaseous hydrocarbons to be produced in the first product via line 335. For example, the addition of a class 2 doping agent such as magnesium or barium can preferentially increase the production of ethylene in the first product recovered via line 335. The addition of a class 13 doping agent, such as gallium, can result in increased production of aromatic hydrocarbons in the first product recovered via line 335. The addition of class 8, 9, or 10 doping agents such as ruthenium, rhodium, or palladium can preferentially increase the production of propylene in the first product recovered via line 335.

In one or more embodiments, doped catalyst particulates and/or regenerated catalyst particulates with or without one or more doping agents or additives can be recycled to the one or more risers 305 via line 320. The flow of regenerated catalyst particulates from the regenerator 315 can be controlled using one or more valves (not shown), which can be manually or automatically adjusted or controlled based upon parameters derived from process temperatures, pressures, flows and/or other process conditions. In one or more embodiments, at least 90 wt %, at least 95 wt %, at least 99 wt %, at least 99.99 wt %, at least 99.9975 wt %, or at least 99.999 wt % of the total regenerated catalyst particulates, makeup catalyst particulates, and/or doped catalyst particulates introduced to the riser 305 via line 320 can be regenerated, optionally doped with one or more doping agents, and recycled via line 320 back to the riser 305.

The hydrocarbon feed in line 330 can be or include hydrocarbon compounds containing about 60 carbon atoms or less, about 40 carbon atoms or less, or about 20 carbon atoms or less. In at least one specific embodiment, the hydrocarbon feed in line 330 can be or include hydrocarbon compounds containing from about 1 to about 16 carbon atoms, about 2 to about 12 carbon atoms, or about 4 to about 8 carbon atoms. The hydrocarbon feed in line 330 can include, but is not limited to, mixed olefins, paraffins, mixtures thereof, and/or any combination thereof. In one or more embodiments, the hydrocarbon feed via line 330 can originate from a refinery. The hydrocarbon feed in line 330 can be or include a liquid and/or gas mixture produced from the distillation of crude oil. In one or more embodiments, the hydrocarbon feed in line 330 can include from about 0.1 percent by volume ("vol. %") to 5 vol. % methane; from about 0.1 vol. % to about 10 vol. % ethane; from about 0.1 vol. % to about 30 vol. % propane. In one or more embodiments, the hydrocarbon feed can contain from about 0 vol. % to about 35 vol. % butane; and from about 0 vol. % to about 20 vol. % pentane and heavier hydrocarbons. In one or more embodiments, the hydrocarbon feed can include at least 60 wt % $C_2$-$C_{11}$ olefins and paraffins.

The hydrocarbon feed introduced via line 330 can be preheated prior to introduction to the riser 305. Although not shown, in at least one specific embodiment, a regenerative heat exchanger using waste process heat can be used to preheat the hydrocarbon feed introduced via line 335. The temperature of the hydrocarbon feed via line 330 can range from about 370° C. to about 790° C., about 425° C. to about 700° C., or about 500° C. to about 650° C. The pressure of the hydrocarbon feed via line 330 can range from about 100 kPa to about 3,450 kPa, about 100 kPa to about 2,450 kPa, or about 100 kPa to about 350 kPa.

The hydrocarbon feed introduced via line 330 can be partially or completely vaporized prior to introduction to the one or more risers 305. The amount of the hydrocarbon feed in line 330 that can be vaporized can range from a low of about 10 vol. %, about 20 vol. %, about 30 vol. %, or about 40 vol. %, to a high of about 70 vol. %, about 80 vol. %, about 90 vol. %, or about 100 vol. %. In one or more embodiments, the hydrocarbon feed can be a minimum of 80 wt % vaporized; 85 wt % vaporized; 90 wt % vaporized; 95 wt % vaporized; or about 99 wt % vaporized prior to introduction to the riser 305. In one or more embodiments, within the riser 305, the pressure and temperature can be adjusted either manually or automatically to compensate for variations in hydrocarbon feed composition and to maximize the yield of preferred hydrocarbons obtained by cracking the hydrocarbon feed in the presence of the one or more doped catalysts.

In one or more embodiments, the steam introduced via line 325 to the riser 305 can be saturated. The pressure of the saturated steam can be a minimum of about 1,000 kPa, about 2,000 kPa, about 4,000 kPa, or about 6,000 kPa. The pressure of the saturated steam can range from about 100 kPa to about 8,300 kPa; about 100 kPa to about 4,000 kPa; or about 100 kPa to about 2,000 kPa.

In one or more embodiments, the steam introduced via line 325 to the riser 305 can be superheated. The pressure of superheated steam can be a minimum of about 1,000 kPa, about 2,000 kPa, about 4,000 kPa, or about 6,000 kPa. The pressure of the superheated steam via line 325 can range from about 100 kPa to about 8,300 kPa; about 100 kPa to about 4,000 kPa; or about 100 kPa to about 2,000 kPa. The temperature of the superheated steam via line 325 can be a minimum of about 200° C., about 230° C., about 260° C., or about 290° C.

In one or more embodiments, the steam can be introduced via line 325 to the riser 305 at a rate proportionate to the hydrocarbon feed rate introduced via line 330. In one or more embodiments, the steam-to-hydrocarbon feed weight ratio can range from about 1:20 to about 50:1; from about 1:20 to about 20:1; or from about 1:10 to about 20:1. In one or more embodiments, the steam-to-hydrocarbon feed weight ratio can remain constant or can vary.

In one or more embodiments, the first product via line 335 can include from about 5 wt % to about 30 wt % $C_2$; about 5 wt % to about 60 wt % $C_3$; about 5 wt % to about 40 wt % $C_4$; about 5 wt % to about 50 wt % $C_5$, and heavier hydrocarbons. In one or more embodiments, the temperature of the first product in line 335 can range from a low of about 350° C., about 400° C., or about 450° C. to a high of about 550° C., about 300° C., or about 700° C.

Although not shown, the particulate discharge or second section 113 and/or line 311 can include one or more valves to manually or automatically adjust or control the flow of spent catalyst to the regenerator 315 based on parameters derived from process temperatures, pressures, flows, and/or other process conditions.

Figure 3:
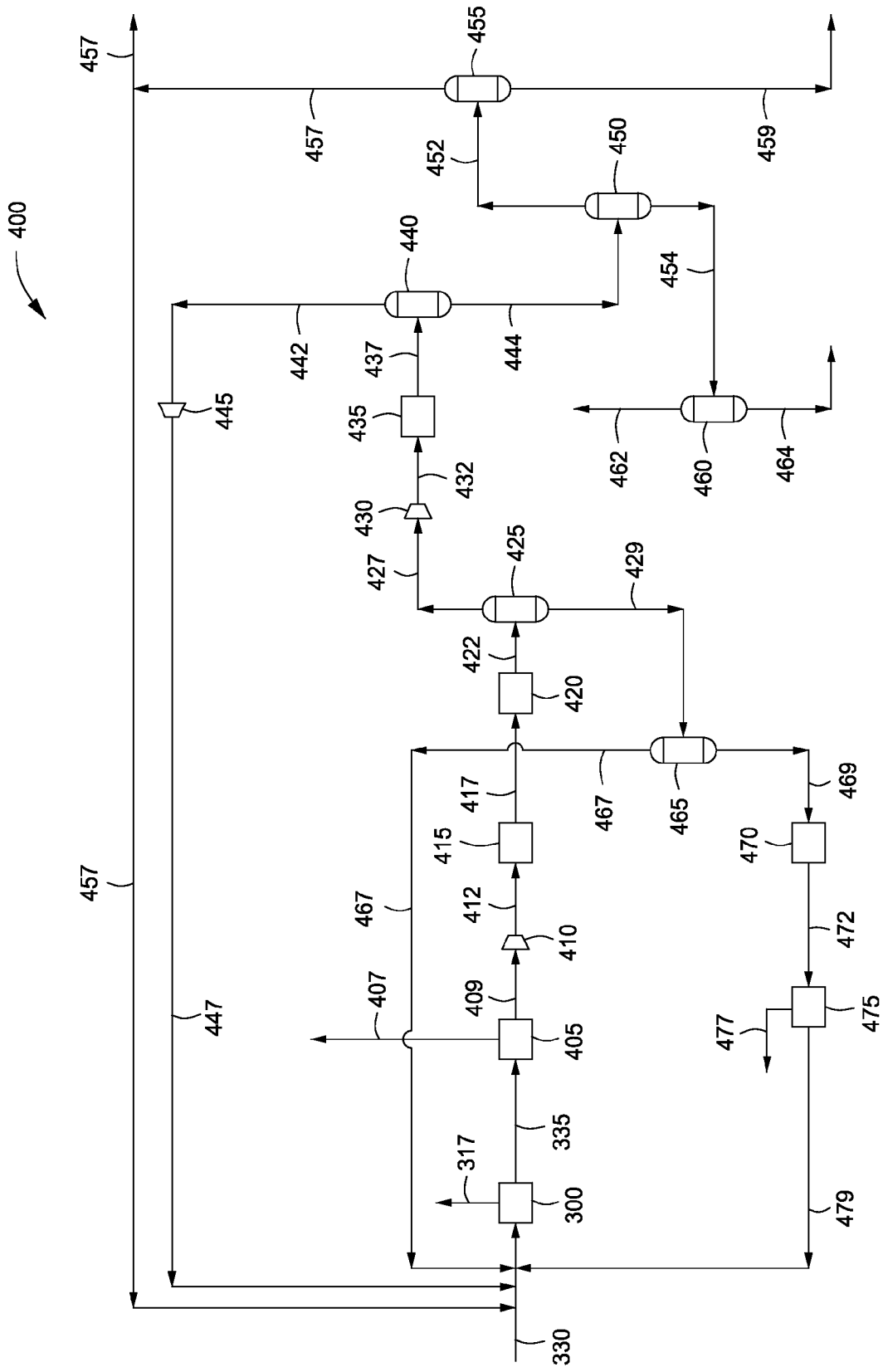
FIG. 3 depicts an illustrative system for producing one or more hydrocarbon products, according to one or more embodiments described.

FIG. 3 depicts an illustrative system 400 for producing one or more hydrocarbon products, according to one or more embodiments. In system 400, the hydrocarbon feed via line 330 can be cracked or separated within one or more FCC systems 300 to provide the first product via line 335, containing naphtha, propylene, ethylene, butane, mixtures thereof, and/or combinations thereof and the flue gas via line 317. The first product in line 335 can be fractionated and/or purified using one or more fractionators 405, treating units 415, drying units 420, and separators 425, 440, 450, 455, 460, and 465 to provide multiple products, including propylene, ethylene, propane, and ethane. One or more products, including methane, ethylene, and heavier $C_4$-$C_6$ hydrocarbons can be recycled to the one or more FCC systems 300.

The first product via line 335 can be separated using the one or more fractionators 405 to provide a naphthenic mixture via line 407 and an olefinic mixture via line 409. The olefinic mixture can include a major portion of one or more $C_2$-$C_{10}$ olefins and a minor portion of one or more $C_2$-$C_{10}$ paraffins. The naphthenic mixture can include $C_7$-$C_{12}$ hydrocarbons, one or more light naphthas and/or one or more heavy naphthas. For example, the naphthenic mixture can include from about 10 wt % to about 40 wt % $C_7$, from about 10 wt % to about 40 wt % $C_8$, from about 5 wt % to about 20 wt % $C_9$, and from about 5 wt % to about 20 wt % $C_{10}$-$C_{12}$ hydrocarbons.

The olefinic mixture via line 409 can include about 30 wt %, 40 wt %, or 50 wt % $C_4$-$C_{10}$ olefins. The olefinic mixture can include from about 10 wt % to about 50 wt % $C_4$, from about 10 wt % to about 50 wt % $C_5$, from about 5 wt % to about 20 wt % $C_6$, from about 5 wt % to about 20 wt % $C_7$, and heavier hydrocarbons. In one or more embodiments, the pressure of the olefinic mixture exiting the fractionator 405 can range from about 100 kPa to about 1,000 kPa.

The olefinic mixture via line 409 can be compressed using one or more compressors 410 to provide a compressed olefinic mixture via line 412. Compressing the olefinic mixture can facilitate the removal of oxygenates, acid gases, water, or any combination thereof from the compressed olefinic mixture in line 412. The compressed olefinic mixture via line 412 can exit the one or more compressors 410 at a pressure ranging from about 100 kPa to about 5,000 kPa, about 100 kPa to about 3,000 kPa, or about 100 kPa to 1,000 kPa. In one or more embodiments, the compressed olefinic mixture can be at a temperature of from about 40° C. to about 300° C.

The compressed olefinic mixture in line 412 can be treated in the one or more treating units 415 to remove oxygenates, acid gases, water, or any combination thereof to provide a treated olefinic mixture via line 417. The treated olefinic mixture via line 417 can include less than about 500 ppmv hydrogen sulfide ("$H_2S$"), less than about 50 ppmv $H_2S$, or less than about 1 ppmv $H_2S$. The treated olefinic mixture can include less than about 500 ppmv $CO_2$; less than about 100 ppmv $CO_2$; or less than about 50 ppmv $CO_2$. The treating unit 415 can include any system or device or combination of systems and/or devices suitable for removing oxygenates, acid gases, water, derivatives thereof, and mixtures thereof, which are well known in the art of hydrocarbon refining.

The treated olefinic mixture via line 417 can be dried using one or more drying units 420, providing a dried olefinic mixture via line 422. The dried olefinic mixture in line 422 can include less than 100 ppmv water, less than 10 ppmv water, less than 1 ppmv water, or less than 0.1 ppmv water. The drying unit 420 can include any system or device or combination of systems and/or devices suitable for removing water from a hydrocarbon to provide the dried olefinic mixture via line 422. For example, the drying unit 420 can include systems that use desiccants, solvents, or any combination thereof for removing water from a hydrocarbon.

The dried olefinic mixture via line 422 can be introduced to one or more separators ("de-propanizer") 425 and separated therein to provide an overhead containing $C_3$ and lighter hydrocarbons via line 427, and a bottoms containing $C_4$ and heavier hydrocarbons via line 429. In one or more embodiments, the $C_3$ and lighter hydrocarbons via line 427 can include about 90 wt %, 95 wt %, or 99 wt % $C_3$ and lighter hydrocarbons. The overhead in line 427 can include from about 10 wt % up to about 40 wt % $C_2$, from about 20 wt % up to about 70 wt % $C_3$, and from about 0.1 wt % to about 1 wt % hydrogen. In one or more embodiments, the overhead in line 427 can exit the de-propanizer 425 at pressures ranging from about 500 kPa to about 2,500 kPa. In one or more embodiments, the pressure of the overhead in line 427 can range from about 500 kPa to about 1,000 kPa.

The bottoms in line 429 can include $C_4$ and heavier hydrocarbons. For example, the bottoms in line 429 can include about 90 wt %, 95 wt %, or 99 wt % $C_4$-$C_{10}$ hydrocarbons. The $C_4$ and heavier hydrocarbons can range from about 30 wt % to about 80 wt % $C_4$, from about 5 wt % to about 30 wt % $C_5$, from about 5 wt % to about 20 wt % $C_6$, and from about 5 wt % to about 20 wt % $C_7$ and heavier hydrocarbons.

The one or more de-propanizers 425 can include, but are not limited to, a column containing internal components, as well as one or more condensers and/or reboilers. The one or more de-propanizers 425 can include packing media to facilitate the selective separation of $C_3$ and lighter hydrocarbons from the $C_4$ and heavier hydrocarbons. For example, each de-propanizer 425 can include one or more saddles, balls, irregular sheets, tubes, spirals, trays, and/or baffles. In one or more embodiments, the operating pressure of the de-propanizer 425 can range from about 500 kPa to about 2,500 kPa, and the operating temperature of the de-propanizer 425 can range from about −60° C. to about 100° C.

The bottoms via line 429 can be introduced to one or more separators ("gasoline splitters") 465 and separated therein to provide an overhead containing $C_4$-$C_6$ hydrocarbons via line 467, and a bottoms containing $C_7$ and heavier hydrocarbons via line 469. The overhead via line 467 can include butanes and isobutanes. For example, the overhead via line 467 can include from about 50 wt % to about 95 wt % butanes. In one or more embodiments, the overhead via line 467 can include from about 10 wt % to about 50 wt % isobutanes. In one or more embodiments, the overhead via line 467 can include from about 10 wt % to about 50 wt % $C_4$ olefins, from about 5 wt % to about 30 wt % $C_5$ olefins, and from about 5 wt % to about 20 wt % $C_6$ olefins.

In one or more embodiments, all or any portion of the overhead in line 467 can be recycled to the FCC system 300. For example, from about 10 wt % to about 100 wt %, from about 20 wt % to about 100 wt %, from about 30 wt % to about 100 wt %, from about 40 wt % to about 100 wt %, or from about 45 wt % to about 100 wt % of the overhead in line 467 can be recycled to the FCC system 300.

The gasoline splitter 465 can include any device, system, or combination of devices and/or systems suitable for separating a hydrocarbon mixture to provide the overhead via line 467 containing the $C_4$-$C_6$ hydrocarbons, and the bottoms via line 469 containing the $C_7$ and heavier hydrocarbons. The gasoline splitter 465 can include, but is not limited to, a column containing internal components, as well as one or more condensers and/or reboilers. The gasoline splitter 465 can include packing media to facilitate the selective separation of $C_6$ and lighter hydrocarbons from $C_7$ and heavier hydrocarbons. For example, each gasoline splitter 465 can include saddles, balls, irregular sheets, tubes, spirals, trays, and/or baffles. The operating pressure of the gasoline splitter 465 can range from about 100 kPa to about 2,500 kPa, and temperature can range from about 20° C. to about 400° C.

In one or more embodiments, all or any portion of the $C_7$ and heavier hydrocarbons in line 469 can be introduced to one or more gasoline hydrotreaters 470 and stabilized therein to provide a treated gasoline via line 472. The treated gasoline via line 472 can include a minimum of about 70 wt %, 80 wt %, or 90 wt % $C_6$ and heavier hydrocarbons. The treated gasoline via line 472 can include about 75 wt % to about 85 wt % $C_6$, about 15 wt % to about 25 wt % $C_7$, or about 5 wt % to about 10 wt % $C_8$ and heavier hydrocarbons. The gasoline hydrotreater 470 can include any system or device or combination of systems and/or devices suitable for stabilizing a mixed hydrocarbon. In one or more embodiments, the hydrotreater 470 can include a system that stabilizes gasoline by treating with hydrogen.

In one or more embodiments, all or any portion of the treated gasoline via line 472 can be introduced to one or more benzene, toluene, xylene ("BTX") units 475 to provide one or more aromatics including, but not limited to, benzene, toluene, xylene, or any combination thereof ("aromatics") via line 479, and a raffinate via line 477. The aromatics via line 479 can include about 40 wt %, 50 wt %, 60 wt %, 70 wt %, or 80 wt % BTX. The BTX can include from about 10 wt % to about 40 wt % benzene, from about 20 wt % to about 60 wt % toluene, and from about 10 wt % to about 40 wt % xylene. In one or more embodiments, at least a portion of the aromatics via line 479 can be combined with the hydrocarbon in line 330 and recycled to the FCC system 300. Although not shown in FIG. 3, in one or more embodiments, at least a portion of the aromatics via line 479 can be directly recycled to the FCC system 300. For example, at least about 10 wt %, 20 wt %, 30 wt %, or 40 wt % of the aromatics via line 479 can be recycled to the riser 305, either directly or via line 330. In at least one specific embodiment, about 10 wt %, 15 wt %, or 20 wt % of the aromatics via line 479 can be recycled to the riser 305 via line 330 or directly (not shown). Although not shown, the raffinate via line 477 can be further processed. For example, all or any portion of the raffinate 477 can be directed to a steam pyrolytic cracker (not shown) to recover any olefinic or paraffinic hydrocarbons contained therein.

Returning to the de-propanizer 425, the overhead via line 427 can be compressed using one or more compressors 430 to provide compressed $C_3$ and lighter hydrocarbons via line 432. Compressing the $C_3$ and lighter hydrocarbons can facilitate the subsequent separation of the lighter compounds from the $C_3$. The pressure of the compressed $C_3$ and lighter hydrocarbons can range from about 500 kPa to about 3,500 kPa, for example. The compressed $C_3$ and lighter hydrocarbons via line 432 can be cooled using one or more chill trains 435 to provide chilled $C_3$ and lighter hydrocarbons via line 437. The temperature of the chilled $C_3$ and lighter hydrocarbons in line 437 can range from about −40° C. to about 40° C. In one or more embodiments, the chilled $C_3$ and lighter hydrocarbons in line 437 can have a temperature from about −20° C. to about 5° C.

The chilled $C_3$ and lighter hydrocarbons via line 437 can be separated using one or more separators ("de-methanizers") 440 to provide an overhead via line 442 containing methane, and a bottoms via line 444 containing $C_2$ and $C_3$ hydrocarbons. The overhead via line 442 can include about 50 mol % to about 95 mol % methane. The overhead via line 442 can include about 70 mol %, 80 mol %, or 90 mol % methane. The bottoms via line 444 can include from about 20 wt % to about 50 wt % $C_2$ and from about 40 wt % to about 80 wt % $C_3$ The operating pressure of the de-methanizer 440 can range from about 300 kPa to about 1,000 kPa. The $C_2$ and $C_3$ hydrocarbons via line 444 can include up to about 95 wt % $C_2$-$C_3$ or more.

In one or more embodiments, all or any portion of the overhead in line 442 can be compressed using one or more compressors 445 to provide compressed methane via line 447, which can be recycled to the FCC system 300 via line 330. Although not shown in FIG. 3, in one or more embodiments, all or any portion of the compressed methane via line 447 can be recycled directly to FCC system 300. The portion of the compressed methane via line 447 that can be recycled to the FCC system 300 can range from about 15 vol. % to about 35 vol. %, from about 20 vol. % to 35 vol. %, from about 25 vol. % to 35 vol. %, or from about 30 vol. % to 35 vol. %. The compressed methane exiting the compressor 445 can be at a temperature ranging from about 25° C. to about 200° C.

The bottoms in line 444 can be introduced to one or more separators ("de-ethanizers") 450 and separated therein to provide an overhead containing a $C_2$ hydrocarbon mixture via line 452, and a bottoms containing a $C_3$ hydrocarbon mixture via line 454. The overhead 452 can include about 90 mol %, 95 mol %, or 99 mol % $C_2$ hydrocarbon mixture. In one or more embodiments, the overhead in line 452 can contain from about 5 mol % to about 70 mol % ethane and from about 30 mol % to about 95 mol % ethylene. The bottoms in line 454 can include about 90 mol %, 95 mol %, or 99 mol % $C_3$ hydrocarbons. In one or more embodiments, the $C_3$ hydrocarbons in line 454 can include from about 5 mol % to about 30 mol % propane and from about 70 mol % to about 95 mol % propylene. The operating pressure of the de-ethanizer 450 can range from about 500 kPa to about 2,500 kPa, and the temperature can range from about −80° C. to about 100° C.

In one or more embodiments, at least a portion of the $C_2$ hydrocarbon mixture in the overhead in line 452 can be introduced to one or more separators ("C2 splitters") 455 and separated therein to provide an ethylene product via line 457 and an ethane product via line 459. The ethane product via line 459 can include about 90 mol %, about 95 mol %, about 99 mol %; or about 99.9 mol % ethane. The ethylene product via line 457 can include about 90 mol %, about 95 mol %, about 99 mol %, or about 99.9 mol % ethylene.

In one or more embodiments, all or any portion of the ethylene product via line 457 can be recycled to the FCC system 300. Recycling at least a portion of the ethylene product can suppress propylene production in the FCC system 300, thereby increasing the yield of ethylene in the first product via line 335. In one or more embodiments, from about 10 vol. % to about 60 vol. %; about 20 vol. % to about 60 vol. %; about 30 vol. % to about 60 vol. %; about 40 vol. % to about 60 vol. %; or about 50 vol. % to about 60 vol.% of the ethylene product via line 457 can be recycled to the FCC system 300. In one or more embodiments, from about 60 vol. % to about 99 vol. %, from about 70 vol. % to about 95 vol. %, or from about 80 vol. % to about 90 vol. % of the ethylene product can be recycled to the FCC system 300. In one or more embodiments, at least a portion of the ethylene present in line 457 can be removed as a finished product.

The C2 splitter 455 can be any device, system, or combination of devices and/or systems suitable for separating a hydrocarbon mixture to provide the ethylene product via line 457 and the ethane product via line 459. The C2 splitter 455 can include, but is not limited to, a column containing internal components, condensers and/or reboilers. The operating pressure of the C2 splitter 455 can range from about 500 kPa to about 2,500 kPa. The operating temperature of the C2 splitter 455 can range from about −80° C. to about 100° C.

The bottoms via line 454, containing $C_3$ hydrocarbons, can be introduced to one or more C3 splitters 460 and separated therein to provide a propylene product ("second product") via line 462 and a propane product via line 464. The propane product in line 464 can contain about 90 mol %, 95 mol %, 99 mol %, or 99.9 mol % propane. The propylene product via line 462 can include from about 60 wt % to about 99.9 wt % propylene.

The C3 splitter 460 can be any device, system, or combination of systems and/or devices suitable for separating the $C_3$ hydrocarbon mixture to provide the propylene product via line 462 and the propane product via line 464. In one or more embodiments, the C3 splitter 460 can include, but is not limited to, a column containing internal components, as well as one or more condensers and/or reboilers. The operating pressure of the C3 splitter 460 can range from about 500 kPa to about 2,500 kPa. In one or more embodiments the operating temperature of the C3 splitter can range from about −100° C. to about 100° C.

Figure 4:
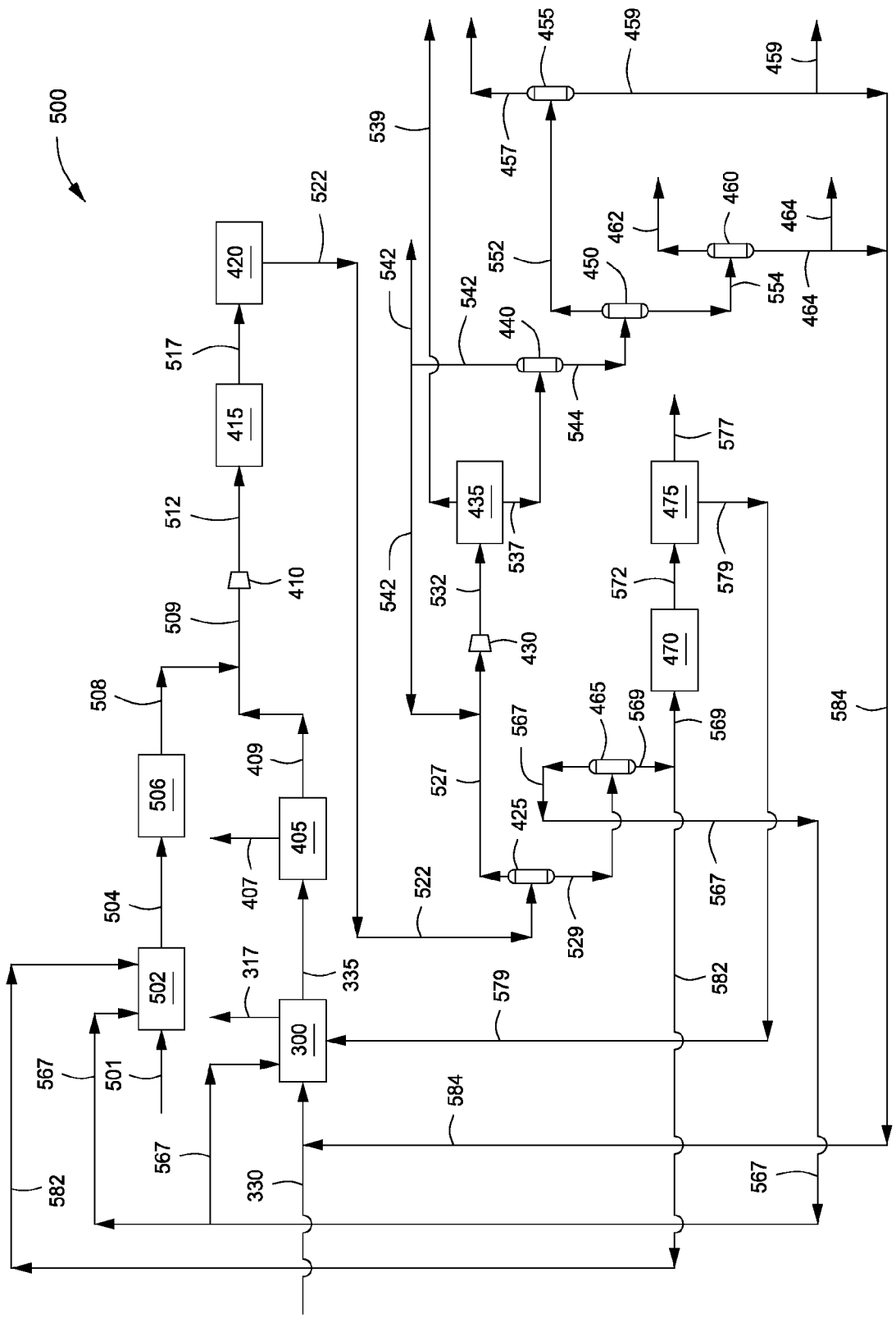
FIG. 4 depicts another illustrative system for producing one or more hydrocarbon products, according to one or more embodiments described.

FIG. 4 depicts another illustrative system 500 for producing one or more hydrocarbon products, according to one or more embodiments. As depicted, the hydrocarbon via line 330 can be introduced to the FCC system 300 and cracked therein to provide the first product via line 335 and the flue gas via line 317. The first product via 335 can be introduced to the one or more fractionators 405 to provide the olefinic mixture via line 409 and the naphthenic mixture via line 407. In one or more embodiments, one or more hydrocarbons ("refinery hydrocarbons") can be introduced via line 501 to one or more crackers 502 and cracked therein to provide product via line 504 containing ethylene, propylene, ethane, propane and/or butane. The product in line 504 can be introduced to one or more quench columns 506 to provide a quenched product via line 508. The quenched product in line 508 can be combined with the olefinic mixture in line 409 to provide a combined hydrocarbon mixture via line 509.

In one or more embodiments, each cracker 502 can be a fluid catalytic riser type reactor containing one or more risers or cracking zones suitable for cracking and/or separating a refinery hydrocarbon. As used herein, the term "refinery hydrocarbon" refers to gas oils, full range gas oils, resids, derivatives thereof, and/or mixtures thereof. In one or more embodiments, at least two fluid catalytic crackers 502 can operate in parallel or series. The temperature of the riser or cracking zone of the fluid catalytic cracker 502 can range from about 400° C. to about 300° C.

In one or more embodiments, the hydrocarbon mixture via line 509 can be compressed using the one or more compressors 410 to provide a compressed mixture via line 512, which can be treated using the one or more treating units 415 to provide a treated mixture via line 517. In one or more embodiments, the treated mixture can be dried using the one or more drying units 420 to provide a dried mixture via line 522. The dried mixture via line 522 can be introduced to the one or more de-propanizers 425 and separated therein to provide an overhead 527 containing $C_3$ and lighter hydrocarbons and a bottoms 529 containing $C_4$ and heavier hydrocarbons.

The $C_4$ and heavier hydrocarbons via line 529 can be introduced to the one or more gasoline splitters 465 and separated therein to provide an overhead 567 containing $C_4$-$C_6$ hydrocarbons and a bottoms 569 containing $C_7$ and heavier hydrocarbons. In one or more embodiments, at least a portion of the $C_4$-$C_6$ hydrocarbons in line 567 can be recycled to the FCC system 300 (not shown) and/or hydrocarbon feed in line 330

(not shown). In one or more embodiments, about 5 wt %, about 15 wt %, about 25 wt %, about 35 wt %, about 45 wt %, about 55 wt %, or about 65 wt % of the $C_4$-$C_6$ hydrocarbons via line 567 can be recycled to the FCC system 300 and/or hydrocarbon feed in line 330.

In one or more embodiments, at least a portion of the $C_4$-$C_6$ hydrocarbons via line 567 can be recycled to the cracker 502 and/or refinery feed 501 (not shown). For example, from about 55 wt % to about 95 wt %, about 55 wt % to about 65 wt %, about 65 wt % to about 75 wt %, about 75 wt % to about 85 wt %, or about 85 wt % to about 95 wt % of the $C_4$-$C_6$ hydrocarbons via line 567 can be recycled to the cracker 502 and/or refinery feed 501 (not shown). In one or more embodiments, from about 10 wt % to about 20 wt %, about 20 wt % to about 30 wt %, about 30 wt % to about 40 wt %, or about 40 wt % to about 50 wt % of the $C_4$-$C_6$ hydrocarbons via line 567 can be recycled to the cracker 502 and/or refinery feed 501 (not shown).

In one or more embodiments, at least a portion of the $C_4$-$C_6$ hydrocarbons via line 567 can be recycled to the FCC system 300 (not shown) and at least a portion to the cracker 502. In one or more embodiments, about 10 wt % to about 60 wt %, about 10 wt % to about 35 wt %, about 25 wt % to about 45 wt %, or about 35 wt % to about 60 wt % of the $C_4$-$C_6$ hydrocarbons via line 567 can be recycled to the FCC system 300 with the balance recycled to the cracker 502. In one or more embodiments, from about 25 wt % to about 99 wt %, from about 25 wt % to about 55 wt %, from about 45 wt % to about 65 wt %, from about 55 wt % to about 85 wt %, or from about 65 wt % to 100 wt % of the $C_4$-$C_6$ hydrocarbons via line 567 can be recycled to the FCC system 300 with the balance to the cracker 502. Recycling at least a portion of the $C_4$-$C_6$ hydrocarbons to the FCC system 300 can increase the production of aromatic BTX. Recycling at least a portion of the $C_4$-$C_6$ hydrocarbons via line 567 to the cracker 502 can increase the production of propylene by increasing the concentration of $C_4$ and higher compounds in the cracker 502.

In one or more embodiments, the gasoline splitter bottoms via line 569, containing $C_7$ and heavier hydrocarbons, can be stabilized using one or more gasoline hydrotreaters 470 to provide a treated gasoline via line 572. In one or more embodiments, at least a portion of the $C_7$ and heavier hydrocarbons in line 569 can be recycled to the cracker 502 via recycle line 582. In one or more embodiments, about 10 wt % to about 20 wt %, about 15 wt % to about 35 wt %, about 30 wt % to 55 wt %, about 50 wt % to about 75 wt %, or about 65 wt % to about 80 wt % of the $C_7$ and heavier hydrocarbons via line 569 can be recycled to the cracker 502 via recycle line 582. Recycling at least a portion of the $C_7$ and heavier hydrocarbons to the cracker 582 can increase the production of ethylene.

The treated gasoline via line 572 can be introduced to one or more BTX units 475 and separated therein to provide aromatics, including, but not limited to, benzene, toluene, xylene, mixtures thereof, or combinations thereof via line 577, and a raffinate via line 579. The aromatics content of the raffinate in line 579 can be less than about 10 wt %, 5 wt %, or 1 wt %. In one or more embodiments, all or any portion of the raffinate via line 579 can be recycled to the FCC system 300. For example, at least 20 wt %, 30 wt %, 40 wt %, or 50 wt % of the raffinate in line 579 can be recycled to the FCC system 300. In one or more embodiments, at least 70 wt %, 80 wt %, or 90 wt % of the raffinate in line 579 can be recycled to the FCC system 300.

Returning to the de-propanizer 425, in one or more embodiments, the overhead, containing $C_3$ and lighter hydrocarbons in line 527 can be compressed using the one or more compressors 430 to provide compressed $C_3$ and lighter hydrocarbons via line 532. In one or more embodiments, the compressed $C_3$ and lighter hydrocarbons via line 532 can be chilled using the one or more chill trains 435 to provide an overhead containing hydrogen via line 539 and a bottoms containing $C_3$ and lighter hydrocarbons via line 537. In one or more embodiments, chilling the compressed $C_3$ and lighter hydrocarbons can further facilitate the separation of hydrogen and other non-condensable components via line 539 from the $C_3$ and lighter hydrocarbons via line 537.

In one or more embodiments, the $C_3$ and lighter hydrocarbons via line 537 can be separated using the one or more de-methanizers 440 to provide an overhead containing methane via line 542 and a bottoms containing $C_2$ and $C_3$ hydrocarbons via line 544. In one or more embodiments, all or any portion of the methane via line 542 can be recycled to the one or more compressors 430. Recycling at least a portion of the methane via line 542 can auto-refrigerate the compressed $C_3$ and lighter hydrocarbons via line 527 thereby improving the recovery of olefins, and increasing the propylene yield in the converted propylene production process.

The $C_2$ and $C_3$ hydrocarbons via line 544 can be separated using the one or more de-ethanizers 450 to provide an overhead containing a $C_2$ hydrocarbon mixture via line 552 and a bottoms containing a $C_3$ hydrocarbon mixture via line 554. In one or more embodiments, one or more C2 splitters 455 can be used to separate the $C_2$ hydrocarbon mixture via line 552 to provide an ethylene product via line 457 and an ethane product via line 459. One or more C3 splitters 460 can be used to separate the $C_3$ hydrocarbon mixture via line 554 to provide a propylene product via line 462 and a propane product via line 464.

In one or more embodiments, all or any portion of the ethane product via line 459 and propane product via line 464 can be recycled to the FCC system 300 via recycle line 584. For example, from about 60 vol. % to about 100 vol. %, from about 70 vol. % to about 100 vol. %, about 80 vol. % to about 100 vol. %, or about 90 vol. % to about 100 vol. % of the ethane product via line 459 and from about 70 vol. % to about 100 vol. %, about 80 vol. % to about 100 vol. %, or about 90 vol. % to about 100 vol. % of the propane product via line 464 can be recycled to the FCC system 300 via line 584. In one or more embodiments, from about 15 vol. % to about 55 vol. %, about 25 vol. % to about 55 vol. %, about 35 vol. % to about 55 vol. %, or about 45 vol. % to about 55 vol. % of the propane product via line 464 can be recycled to the FCC system 300. In at least one specific embodiment, from about 15 vol. % to about 45 vol. %, about 25 vol. % to about 45 vol. %, or about 35 vol. % to about 45 vol. % of the ethane product via line 584 can be recycled to the FCC system 300.

Figure 5:
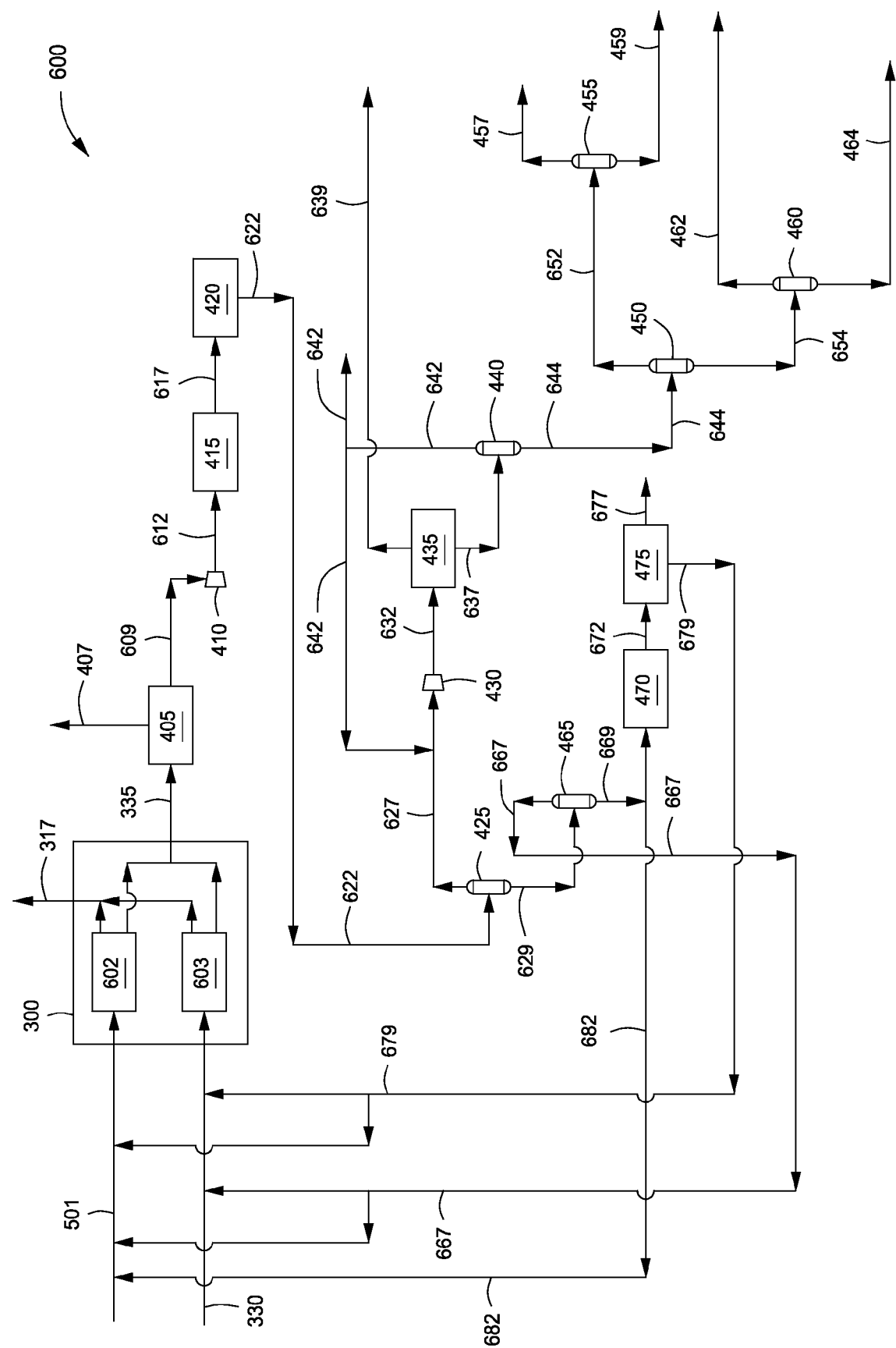
FIG. 5 depicts another illustrative system for producing one or more hydrocarbon products, according to one or more embodiments described.

FIG. 5 depicts another illustrative system 600 for producing one or more hydrocarbon products, according to one or more embodiments. In one or more embodiments, each FCC system 300 can include two or more risers or zones 602, 603 each independently operated at conditions sufficient to crack or otherwise separate different feeds or cuts into one or more olefins. In one or more embodiments, the refinery hydrocarbon via line 501 can be introduced to the riser or first zone 602 and the feedstock via line 330 can be introduced to the second riser or cracking zone 603. The effluents from each riser or cracking zone 602, 603 can be combined, forming the first product ("hydrocarbon mixture") via line 335. In one or more embodiments, the hydrocarbon mixture can be fractionated and purified using the one or more fractionators 405, treating units 415, 420 and separators 425, 440, 450, 455, 460 and 465, all as described above with reference to FIGS. 3 and 4, to provide multiple products via line 335 including propylene, ethylene, propane and ethane.

As discussed and described above in reference to FIG. 2 a regenerator waste gas or flue gas from the FCC system 300 can be recovered via line 317. The two or more risers (two are shown 602, 603) can each include one or more independent regenerators (not shown) or the two or more risers can share a single or multiple regenerators (not shown) to provide the flue gas via line 317. In one or more embodiments, the one or more independent regenerators and/or the shared single or multiple regenerators can be similar to, or the same as, the regenerator 315 discussed and described above with reference to FIG. 2.

The first product via line 335 can be introduced to the one or more fractionators 405 and separated therein to provide a naphthenic mixture via line 407 and an olefinic mixture via line 609. The naphthenic mixture can include, but is not limited to, light naphthas, heavy naphthas, naphthenic compounds, derivatives thereof, mixtures thereof, or combinations thereof. The olefinic mixture via line 609 can be compressed using the one or more compressors 410 to provide a compressed olefinic mixture via line 612, which can be treated using the one or more treating units 415 to provide a treated olefinic mixture via line 617. The treated olefinic mixture can be introduced to the one or more drying units 420 to provide dried olefinic mixture via line 622.

The dried olefinic mixture via line 622 can be introduced to the one or more de-propanizers 425 and separated therein to provide an overhead containing $C_3$ and lighter hydrocarbons via line 627, and a bottoms containing $C_4$ and heavier hydrocarbons via line 629. In one or more embodiments, the $C_4$ and heavier hydrocarbons via line 629 can be introduced to the one or more gasoline splitters 465 and separated therein to provide an overhead containing $C_4$-$C_6$ hydrocarbons via line 667 and a bottoms containing $C_7$ and heavier hydrocarbons via line 669.

In one or more embodiments, at least a portion of the $C_4$-$C_6$ hydrocarbons via line 667 can be recycled to the first riser or cracking zone 602 and/or the second riser or cracking zone 603. For example, about 10 wt % to about 60 wt %, about 10 wt % to about 35 wt %, about 25 wt % to about 45 wt %, or about 35 wt % to about 60 wt % of the $C_4$-$C_6$ hydrocarbons via line 667 can be recycled to the first riser or cracking zone 602 with the balance recycled to the second riser or cracking zone 603. In one or more embodiments, from about 25 wt % to about 100 wt %, 25 wt % to about 55 wt %, about 45 wt % to about 65 wt %, about 55 wt % to about 85 wt %, or about 65 wt % to 99 wt % of the $C_4$-$C_6$ hydrocarbons via line 667 can be recycled to the first riser or cracking zone 602 with the balance to the second riser or cracking zone 603. Recycling at least a portion of the $C_4$-$C_6$ hydrocarbons via line 667 to the first riser or cracking zone 602 can increase the production of the aromatics (i.e. BTX). Recycling at least a portion of the $C_4$-$C_6$ hydrocarbons via line 667 to the second riser or cracking zone 603 can increase the production of propylene.

In one or more embodiments, at least a portion of the $C_7$ and heavier hydrocarbons via line 669 can be recycled via line 682 to the first riser or cracking zone 602. In one or more embodiments, from about 10 wt % to about 20 wt %, about 15 wt % to about 35 wt %, about 30 wt % to 55 wt %, about 50 wt % to about 75 wt %, or about 65 wt % to about 80 wt % of the $C_7$ and heavier hydrocarbons in line 669 can be recycled to the first riser or cracking zone 602 via recycle line 682. Recycling at least a portion of the $C_7$ and heavier hydrocarbons via line 682 can increase the production of ethylene by increasing the concentration of heavy hydrocarbons in the first riser or cracking zone 602.

The $C_7$ and heavier hydrocarbons via line 669 can be stabilized using the one or more gasoline hydrotreaters 470 to provide a treated gasoline via line 672. The treated gasoline via line 672 can be separated using the one or more BTX units 475 to separate the aromatics via line 677 from a raffinate via line 679.

In one or more embodiments, at least a portion of the raffinate via line 679 can be recycled to the second riser or cracking zone 603. The raffinate via line 679 can be lean in aromatics, for example, the raffinate via line 679 can include less than about 10 wt %, 5 wt %, or 1 wt % BTX. In one or more embodiments, at least 70 wt %, 80 wt %, or 90 wt % of the raffinate via line 679 can be recycled to the second riser or cracking zone 603 with the balance to the first riser or cracking zone 602. In one or more embodiments, at least 20 wt %, 30 wt %, 40 wt %, or 50 wt % of the raffinate via line 679 can be recycled to the first riser or cracking zone 602. In one or more embodiments, at least 20 wt %, 30 wt %, 40 wt %, or 50 wt % of the raffinate via line 679 can be recycled to the second riser or cracking zone 603 with the balance to the first riser or cracking zone 602. In one or more embodiments, at least 70 wt %, 80 wt %, or 90 wt % of the raffinate via line 679 can be recycled to the second riser or cracking zone 603 with the balance to the first riser or cracking zone 602.

Although not shown in FIG. 5, in one or more embodiments, all or any portion of the aromatics via line 677 can be recycled to the first riser or cracking zone 602. For example, at least 20 wt %, 40 wt %, 60 wt %, 80 wt %, or 90 wt % of the aromatics via line 677 can be recycled to the first riser or cracking zone 602.

Returning to the de-propanizer 425, in one or more embodiments, the $C_3$ and lighter hydrocarbons via line 627 can be compressed using the one or more compressors 430 to provide compressed $C_3$ and lighter hydrocarbons via line 632. The compressed $C_3$ and lighter hydrocarbons via line 632 can be chilled and separated using one or more chill trains 435 to provide an overhead containing hydrogen and non-condensable gases, mixtures thereof and combinations thereof via line 639, and a bottoms containing $C_3$ and lighter hydrocarbons via line 637.

The $C_3$ and lighter hydrocarbons via line 637 can be introduced to the one or more de-methanizers 440 and separated therein to provide an overhead containing methane via line 642 and a bottoms containing $C_2$ and $C_3$ hydrocarbons via line 644. In one or more embodiments, all or any portion of the methane via line 642 can be recycled to the inlet of the one or more compressors 430. Recycling at least portion of the methane via line 642 auto-refrigerates the compressed $C_3$ and lighter hydrocarbons in line 627 thereby improving the recovery of olefins and increasing the propylene yield in the converted propylene production process.

The $C_2$ and $C_3$ hydrocarbons via line 644 can be introduced to the one or more de-ethanizers 450 and separated therein to provide an overhead containing a $C_2$ hydrocarbon mixture via line 652 and a bottoms containing a $C_3$ hydrocarbon mixture via line 654. The $C_2$ hydrocarbon mixture via line 652 can be introduced to the one or more C2 splitters 455 and separated therein to provide an ethylene product via line 457 and an ethane product via line 459. The one or more C3 splitters 460 can be used to separate the $C_3$ hydrocarbon mixture via line 654 to provide the propylene product via line 462 and the propane product via line 464.

Figure 6:
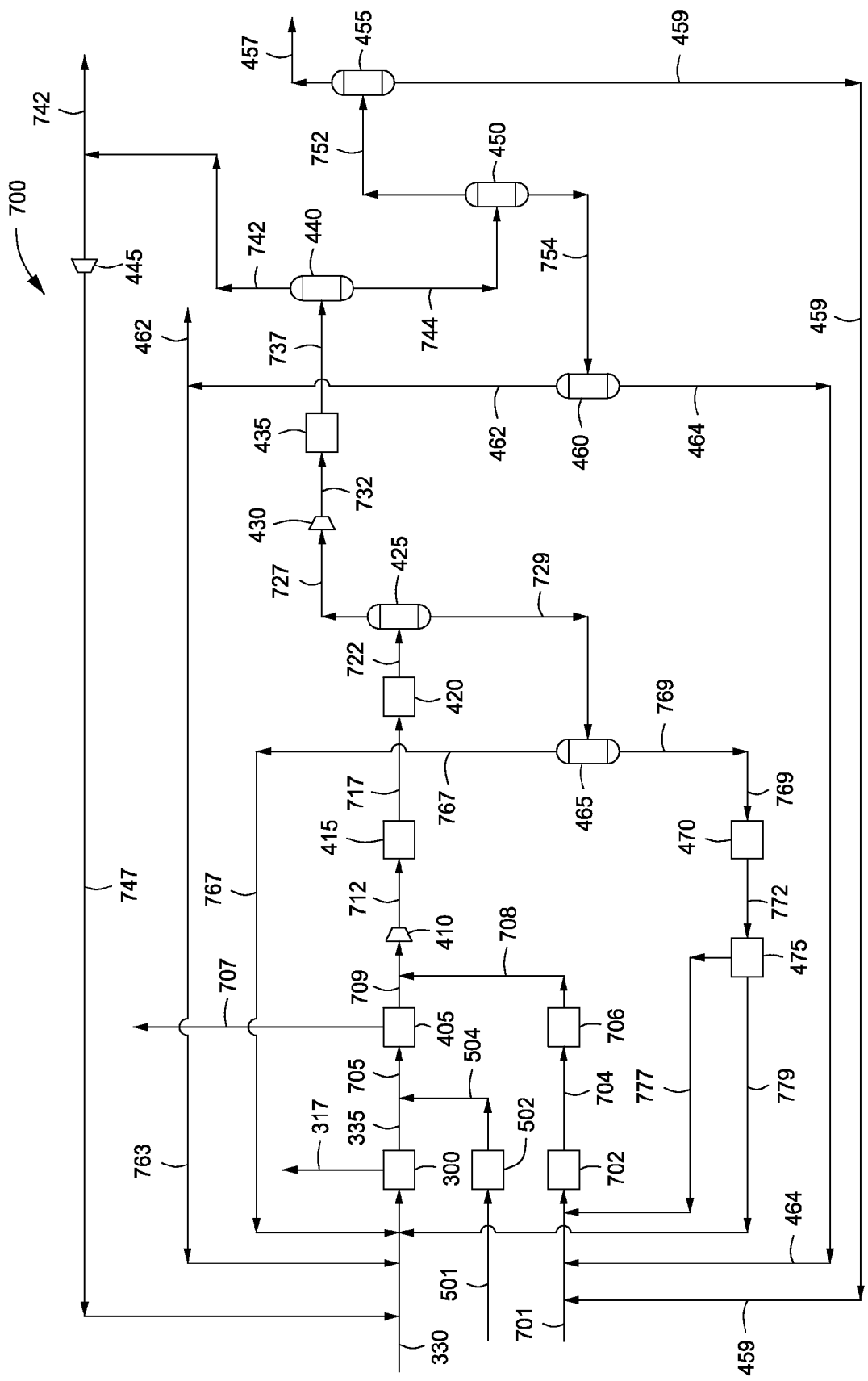
FIG. 6 depicts yet another illustrative system for producing one or more hydrocarbon products, according to one or more embodiments described.

FIG. 6 depicts yet another illustrative system 700 for producing one or more hydrocarbon products, according to one or more embodiments. In one or more embodiments, the hydrocarbon via line 330 can be introduced to the FCC system 300 and cracked therein to provide the first product via line 335. In one or more embodiments, one or more refinery hydrocarbons and/or light hydrocarbons via line 501 can be introduced to the cracker 502 and cracked therein to provide a cracked hydrocarbon via line 504. In one or more embodiments, one or more alkanes can be introduced via line 701 to one or more steam pyrolytic crackers 702 to provide an effluent ("cracked alkanes") via line 704. The cracked alkanes via line 704 can be cooled using one or more quench columns 706 to provide a cooled effluent via 708. As discussed and described above in reference to FIGS. 2-5 a regenerator waste gas or flue gas provided from the FCC system 300 can be recovered via line 317.

Although not shown in FIG. 6, in one or more embodiments, one or more mixed hydrocarbon feeds can be introduced to one or more pre-fractionators. Within the one or more pre-fractionators, the mixed hydrocarbon feed can be fractionated or otherwise separated to provide at least a portion of the feedstock in line 330, at least a portion of the one or more refinery hydrocarbons and/or light hydrocarbons via line 501, and/or at least a portion of the one or more alkanes via line 701.

The first product via line 335 and the cracked hydrocarbon via line 504 can be combined to provide a second hydrocarbon mixture via line 705. The second hydrocarbon mixture in line 705 can be fractionated using the one or more fractionators 405 to provide an olefinic mixture via 709 and a naphthenic mixture via line 707. The olefinic mixture via 709 can be combined with the quenched effluent via 708 and purified using the one or more treating units 415, 420 and separators 425, 440, 450, 455, 460 and 465 to provide multiple products including propylene, ethylene, propane and ethane. Heavier $C_4$-$C_6$ hydrocarbons, separated from the finished products, can be recycled to the FCC system 300, cracker 502, and/or steam pyrolytic cracker 702 as depicted in FIG. 6.

The one or more fractionators 405 can remove heavy naphtha, light cycle oil, slurry oil, or any combination thereof from the second hydrocarbon mixture to recover the olefinic mixture via line 709 and the naphthenic mixture via line 707. In one or more embodiments, the olefinic mixture can include one or more $C_2$-$C_{10}$ olefins. In one or more embodiments, the naphthenic mixture via line 707 can include about 40 wt % to about 90 wt % $C_7$-$C_{12}$ hydrocarbons. In one or more embodiments, the naphtha via line 707 can include from about 5 wt % to about 40 wt % $C_7$, from about 5 wt % to about 40 wt % $C_8$, from about 5 wt % to about 20 wt % $C_9$, or from about 5 wt % to about 10 wt % $C_{10}$ and heavier hydrocarbons. The olefinic mixture via line 709 can include 20 wt % to 90 wt % of the one or more $C_2$-$C_{10}$ hydrocarbons. In one or more embodiments, the olefinic mixture can include from about 5 wt % to about 30 wt % $C_4$, from about 5 wt % to about 30 wt % $C_5$, from about 5 wt % to about 30 wt % $C_6$, and from about 5 wt % to about 20 wt % $C_7$ and heavier hydrocarbons. In one or more embodiments, the olefinic mixture can exit the fractionator 405 at a pressure of about 100 kPa up to about 500 kPa.

In one or more embodiments, the refinery and/or light hydrocarbons via line 501 can be introduced to the cracker 502 at a temperature ranging from about 25° C. to about 300° C. In one or more embodiments, the refinery and/or light hydrocarbons can be pre-heated to temperatures ranging from about 25° C. to about 200° C. prior to cracking.

In one or more embodiments, the alkanes introduced via line 701 to the steam pyrolytic cracker 702 can include one or more paraffinic hydrocarbons having two or more carbon atoms. The alkanes can include one or more $C_2$-$C_{12}$ paraffinic hydrocarbons. The one or more alkanes can be introduced to the cracker 702 at a temperature of about 25° C. to about 200° C. The one or more alkanes can be introduced to the steam pyrolytic cracker 702 at a pressure of about 100 kPa to about 2,000 kPa.

The cracked hydrocarbons via line 504 can include 50 wt %, 60 wt %, or 70 wt % $C_4$-$C_{10}$. In one or more embodiments, the cracked hydrocarbons in line 504 can include from about 1 wt % to about 10 wt % $C_2$, from about 1 wt % to about 20 wt % $C_3$, from about 5 wt % to about 25 wt % $C_4$, from about 5 wt % to about 25 wt % $C_5$, and from about 30 wt % to about 70 wt % $C_6$ and heavier hydrocarbons. In one or more embodiments, the cracked hydrocarbons can exit the fluidized catalytic cracker 502 at a temperature of about 300° C. to about 400° C.

The alkane feed via line 701 can include methane, ethane, propane, butane, mixtures thereof and/or combinations thereof. In one or more embodiments, the alkane feed via line 701 can include from about 70 wt %, about 80 wt %, or about 90 wt % $C_2$-$C_3$ alkanes. In one or more embodiments, the alkane feed via line 701 can be introduced to a convection zone (not shown) of the steam pyrolytic cracker 702 at a temperature of about 100° C. to about 300° C. The alkane feed can be heated in the convection zone of the steam pyrolytic cracker 702 to a temperature of about 400° C. to about 700° C. In one or more embodiments, the alkane feed can be partially vaporized in the convection zone. For example, about 10 wt %, 20 wt %, 30 wt %, 40 wt %, or 50 wt % of the alkane feed can be vaporized in the convection zone of the steam pyrolytic cracker 702. In one or more embodiments, a minimum of 55 wt %, 65 wt %, 75 wt %, 85 wt %, 95 wt %, or 100 wt % of the alkane feed via line 701 can be vaporized in the convection zone of the steam pyrolytic cracker 702. In one or more embodiments, the quenched effluent in line 708 can include about 20 wt % to about 60 wt % ethane and about 5 wt % to about 30 wt % propane.

In one or more embodiments, the quench column 706 can be any device, system, or combination of systems and/or devices suitable for reducing the temperature of the cracked hydrocarbon mixture in line 704. Reducing the temperature of the cracked hydrocarbon can reduce or stop the rate of hydrocarbon cracking. The quench column 706 can include packing media to provide surface area for the cracked alkanes and a heat transfer medium to make thermal contact. For example, the packing media can include rings, saddles, balls, irregular sheets, tubes, spirals, trays, baffles, or any combination thereof. The cooled hydrocarbons can exit the quench column 706 via line 708 at a temperature from about 25° C. to about 100° C.

The cooled hydrocarbons via line 708 can be combined with the olefinic mixture via line 709 and compressed using one or more compressors 410. A compressed olefinic mixture via line 712 can exit the one or more compressors 410 at a pressure of from about 500 kPa to about 4,000 kPa. The pressure of the compressed olefinic mixture via line 712 can range from about 500 kPa to 3,000 kPa; or about 500 kPa to 1,000 kPa. The compressed olefinic mixture in line 712 can be at a temperature of from about 40° C. to about 300° C.

The compressed olefinic mixture via line 712 can be treated using one or more treating units 415 to remove oxygenates, acid gases, water, or any combination thereof to provide a treated olefinic mixture via line 717. In one or more embodiments, the treated olefinic mixture via line 717 can include less than about 500 ppmv $H_2S$, less than about 50 ppmv $H_2S$, or less than about 1 ppmv $H_2S$. In one or more embodiments, the treated olefinic mixture in line 717 can include less than about 500 ppmv $CO_2$, less than about 100 ppmv $CO_2$, or less than about 50 ppmv $CO_2$.

The treated olefinic mixture via line 717 can be dried in the one or more drying units 420 to provide dried olefinic mixture via line 722. The dried olefinic mixture can include less than 100 ppmv water; less than 10 ppmv water; or less than 0.1 ppmv water. In one or more embodiments, the dried olefinic mixture can include less than 5 ppmv water; less than 1 ppmv water; or less than 0.5 ppmv water.

The dried olefinic mixture in line 722 can be introduced to one or more de-propanizers 425 and separated therein to provide an overhead containing $C_3$ and lighter hydrocarbons via line 727, and a bottoms containing $C_4$ and heavier hydrocarbons via line 729. The $C_3$ and lighter hydrocarbons via line 727 can include 90 wt %, 95 wt %, or 99 wt % $C_3$ and lighter hydrocarbons. The $C_3$ and lighter hydrocarbons can include hydrogen. The $C_3$ and lighter hydrocarbons can include from about 10 wt % to about 40 wt % $C_2$, from about 20 wt % to about 70 wt % $C_3$, and from about 0.1 wt % to about 1 wt % $H_2$. The $C_3$ and lighter hydrocarbons via line 727 can exit the de-propanizer 425 at a pressure of from about 500 kPa to about 2,500 kPa. The pressure of the $C_3$ and lighter hydrocarbons in line 727 can be from about 500 kPa to about 1,000 kPa. The $C_4$ and heavier hydrocarbons via line 729 can include 90 wt %, 95 wt %, or 99 wt % $C_4$-$C_{10}$ hydrocarbons. The $C_4$ and heavier hydrocarbons via line 729 can include from about 30 wt % to about 80 wt % $C_4$, from about 5 wt % to about 30 wt % $C_5$, from about 5 wt % to about 20 wt % $C_6$, and from about 5 wt % to about 20 wt % $C_7$ and heavier hydrocarbons.

The $C_4$ and heavier hydrocarbons via line 729 can be introduced to the one or more gasoline splitters 465 and separated therein to provide an overhead containing $C_4$-$C_6$ hydrocarbons via line 767, and bottoms containing $C_7$ and heavier hydrocarbons via line 769. In one or more embodiments, the $C_7$ and heavier hydrocarbons can include about 80 wt %, 90 wt %, or 95 wt % $C_4$-$C_6$, and from about 5 wt % to about 80 wt % $C_7$ and heavier hydrocarbons. In one or more embodiments, the $C_7$ and heavier hydrocarbons can include from about 40 wt % to about 80 wt % $C_4$, from about 5 wt % to about 60 wt % $C_5$, from about 1 wt % to about 30 wt % $C_6$, from about 1 wt % to about 20 wt % $C_7$, and from about 1% to about 10 wt % $C_8$ and heavier hydrocarbons.

In one or more embodiments, at least a portion of the $C_4$-$C_6$ hydrocarbons via line 767 can be recycled directly to the FCC system 300 (not shown). For example, about 55 wt % to about 65 wt %, about 65 wt % to about 75 wt %, about 75 wt % to about 85 wt %, or about 85 wt % to about 95 wt % of $C_4$-$C_6$ hydrocarbons via line 767 can be recycled to the FCC system 300. In one or more embodiments, about 10 wt % to about 20 wt %, about 20 wt % to about 30 wt %, about 30 wt % to about 40 wt %, or about 40 wt % to about 50 wt % of the $C_4$-$C_6$ hydrocarbons via line 767 can be recycled to the FCC system 300. In one or more embodiments, at least a portion of the $C_4$-$C_6$ hydrocarbons via line 767 can be combined with the hydrocarbon in line 330. In one or more embodiments, about 10 wt % to about 20 wt %, about 20 wt % to about 30 wt %, about 30 wt % to about 40 wt %, or about 40 wt % to about 50 wt % of $C_4$-$C_6$ hydrocarbons via line 767 can be combined with the hydrocarbon in line 330. In one or more embodiments, about 5 wt % to about 35 wt %, about 15 wt % to about 55 wt %, about 45 wt % to about 70 wt %, about 60 wt % to about 85 wt %, or about 75 wt % to about 100 wt % of the $C_4$-$C_6$ hydrocarbons via line 767 can be combined with hydrocarbon in line 330.

The $C_4$-$C_6$ hydrocarbons via line 767 can include butanes and isobutanes. The $C_4$-$C_6$ hydrocarbons can include from about 10 wt % to about 50 wt % butanes. The $C_4$-$C_6$ hydrocarbons can include from about 10 wt % to about 50 wt % isobutanes. The $C_4$-$C_6$ hydrocarbons via line 767 can include $C_4$-$C_6$ olefins from about 50 wt % to about 90 wt % $C_4$-$C_6$ olefins. The $C_4$-$C_6$ hydrocarbons via line 767 can include from about 10 wt % to about 50 wt % $C_4$ olefins, from about 10 wt % to about 50 wt % $C_5$ olefins, and from about 5 wt % to about 30 wt % $C_6$ olefins.

The $C_7$ and heavier hydrocarbons via line 769 can be stabilized using the one or more gasoline hydrotreaters 470 to provide a treated gasoline via line 772. The treated gasoline can include from about 70 wt %, 80 wt %, or 90 wt % $C_6$ and heavier hydrocarbons. The treated gasoline can include from about 75 wt % to about 85 wt % $C_6$, from about 15 wt % to about 25 wt % $C_7$, and from about 5 wt % to about 10 wt % $C_8$ and heavier hydrocarbons.

The treated gasoline in line 772 can be separated using the one or more BTX units 475 to separate the aromatics via line 779, and a raffinate via line 777. The aromatics concentration in line 779 can include about 40 wt %, about 50 wt %, about 60 wt %, about 70 wt %, or about 80 wt % BTX. The aromatics can include from about 10 wt % to about 40 wt % benzene, from about 20 wt % to about 60 wt % toluene, and from about 10 wt % to about 40 wt % xylene. In one or more embodiments, at least a portion of the aromatics via line 779 can be directly recycled to the FCC system 300 (not shown in FIG. 6), or recycled to the FCC system 300 via line 330. In one or more embodiments, about 10 wt %, about 20 wt %, about 30 wt %, or about 40 wt % of the aromatics can be recycled to the FCC system 300. In at least one specific embodiment, about 10 wt %, about 15 wt %, or about 20 wt % of the aromatics via line 779 can be recycled to FCC system 300.

The raffinate via line 777 can be lean in aromatics, for example, the raffinate can include less than about 40 wt %, 30 wt %, 20 wt %, or 10 wt % BTX. In one or more embodiments, at least a portion of the raffinate in line 777 can be directly recycled (not shown) or recycled to the steam pyrolytic cracker 702 via the alkane feed in line 701. In one or more embodiments, about 20 wt %, about 30 wt %, about 40 wt %, or about 50 wt % of the raffinate can be recycled to the steam pyrolytic cracker 702. In one or more embodiments, about 70 wt %, about 80 wt %, or about 90 wt % of the raffinate in line 777 can be recycled to the steam pyrolytic cracker 702 via the alkane feed in line 701.

Returning to the de-propanizer 425, in one or more embodiments, the $C_3$ and lighter hydrocarbons exiting via line 727 can be compressed using the one or more compressors 430. Compressing the $C_3$ and lighter hydrocarbons can facilitate the separation of lighter hydrocarbons from the heavier hydrocarbons via line 727. The compressed $C_3$ and lighter hydrocarbons exiting the one or more compressors 430 via line 732 can have a pressure of about 500 kPa to about 3,500 kPa. The compressed $C_3$ and lighter hydrocarbons can exit the one or more compressors at a pressure of about 500 kPa to about 1,500 kPa. The compressed $C_3$ and lighter hydrocarbons can exit the one or more compressors 430 at a temperature of about 5° C. to about 100° C.

The compressed $C_3$ and lighter hydrocarbons via line 732 can be chilled using the one or more chill trains 435 to provide chilled $C_3$ and lighter hydrocarbons via line 737. The chilled $C_3$ and lighter hydrocarbons can exit the one or more chill trains 435 at a temperature of about −40° C. to about 40° C. The chilled $C_3$ and lighter hydrocarbons can have a temperature from about −20° C. to about 5° C.

The chilled $C_3$ and lighter hydrocarbons via line 737 can be introduced to the one or more de-methanizers 440 and separated therein to provide an overhead containing methane via line 742 and a bottoms containing $C_2$ and $C_3$ hydrocarbons via line 744. The de-methanizer overhead in line 742 can include from about 50 wt % to about 95 wt % methane or from about 70 wt %, about 80 wt %, or about 90 wt % methane. The pressure of the overhead in line 742 can range from about 300 kPa to about 1,000 kPa. The de-methanizer bottoms in line 744 can include from about 20 wt % to about 50 wt % $C_2$ and from about 40 wt % to about 80 wt % $C_3$.

The methane exiting the de-methanizer 440 can be compressed using the one or more compressors 445 to provide a compressed methane via line 747 which can be recycled to the FCC system 300 via line 330, as shown or recycled directly to FCC system 300 (not shown). Although not shown, the methane via line 742 can be directly recycled to the FCC system 300 via line 330. In one or more embodiments, about 15 vol. % to about 35 vol. %; about 20 vol. % to about 35 vol. %; about 25 vol. % to about 35 vol.%; or about 30 vol. % to about 35 vol. % of the methane via line 742 can be recycled to the FCC system 300. The compressed methane via line 747 can be at a pressure of about 100 kPa to about 1,000 kPa, and a temperature of about 25° C. to about 200° C. In one or more embodiments, at least a portion of the methane in line 742 can be removed via line 742 as a final product.

The $C_2$ and $C_3$ hydrocarbons via line 744 can be introduced to the one or more de-ethanizers 450 and separated therein to provide an overhead containing a $C_2$ hydrocarbon mixture via line 752 and a bottoms containing a $C_3$ hydrocarbon mixture via line 754. The overhead in line 752 can include about 90 wt %, about 95 wt %, or about 99 wt % $C_2$. The overhead in line 752 can include from about 5 wt % to about 70 wt % ethane and from about 30 wt % to about 95 wt % ethylene. The bottoms in line 754 can include about 90 wt %, about 95 wt %, or about 99 wt % $C_3$. In one or more embodiments, the bottoms in line 754 can include from about 5 wt % to about 30 wt % propane and from about 70 wt % to about 95 wt % propylene.

The $C_2$ hydrocarbon mixture via line 752 can be introduced to the one more C2 splitters 455 and separated therein to provide an overhead ("ethylene product") via line 457 and a bottoms ("ethane product") via line 459. In one or more embodiments, the ethylene product in line 457 can include about 90 wt %, about 95 wt %, or about 99 wt % ethylene. In one or more embodiments, the ethylene product in line 457 can include about 95 wt %, about 99 wt %, or about 99.9 wt % ethylene. The ethane product in line 459 can include about 90 wt %, about 95 wt %, or about 99 wt % ethane. In one or more embodiments, the ethane product in line 459 can include about 95 wt %, about 99 wt %, or about 99.9 wt % ethane.

The $C_3$ hydrocarbon mixture via line 754 can be introduced to one or more C3 splitters 460 and separated therein to provide an overhead ("propylene product" or "second product") via line 462 and a bottoms ("propane product") via line 464. The propane product in line 464 can include about 90 wt %, about 95 wt %, or about 99 wt % propane. The propylene product in line 462 can include about 80 wt %, about 90 wt %, or about 95 wt % propylene.

All or any portion of the propylene product via line 462 can be recycled via line 763 to the hydrocarbon feed in line 330 and/or directly to the FCC system 300 (not shown). Recycling at least a portion of the propylene to the FCC system 300 via the hydrocarbon feed in line 330 or directly can suppress propylene production in the FCC system 300, thereby preferentially increasing the ethylene yield. In one or more embodiments, about 10 vol. % to about 60 vol. %; about 20 vol. % to about 60 vol.%; about 30 vol. % to about 60 vol. %; about 40 vol. % to about 60 vol. %; or about 50 vol. % to about 60 vol. % of the propylene product in line 462 can be recycled via line 763 to the hydrocarbon feed in line 330 and/or FCC system 300. In one or more embodiments, about 60 vol. % to about 100 vol. %; about 70 vol. % to about 100 vol. %; about 80 vol. % to about 100 vol. %; or about 90 vol. % to about 100 vol. % of the propylene product in line 462 can be recycled via line 763 to the hydrocarbon feed in line 330 and/or FCC system 300.

In one or more embodiments, all or any portion of the ethane product via line 459 can be recycled to the one or more steam pyrolytic crackers 702 via the alkane feed in line 701. In one or more embodiments, all or any portion of the propane product via line 464 can be recycled to the one or more steam pyrolytic crackers 702 via the alkane feed in line 701. For example, about 60 vol. % to about 100 vol. %, about 70 vol. % to about 100 vol. %, about 80 vol. % to about 100 vol. %, or about 90 vol. % to about 100 vol. % of the ethane product via line 459 and about 70 vol. % to about 100 vol. %, about 80 vol. % to about 100 vol. %, or about 90 vol. % to about 100 vol. % of the propane product via line 464 can be recycled to the one or more steam pyrolytic crackers 702, either directly (not shown) or via the alkane feed in line 701. In one or more embodiments, about 15 vol. % to about 55 vol. %, about 25 vol. % to about 55 vol. %, about 35 vol. % to about 55 vol. %, or about 45 vol. % to about 55 vol. % of the propane product via line 464 can be recycled to the one or more steam pyrolytic crackers 702. In one or more embodiments, about 15 vol. % to about 45 vol. %, about 25 vol. % to about 45 vol. %, or about 35 vol. % to about 45 vol. % of the ethane product via line 459 can be recycled to the one or more steam pyrolytic crackers 702. In one or more embodiments, at least a portion of the ethane product in line 459 can be removed as a finished product (not shown).

Embodiments of the present invention further relate to any one or more of the following numbered paragraphs 1 through 28:

1. An apparatus for separating particulates from a fluid, comprising a separation section having at least one wall, a first end, a second end and an inner metal surface exposed to an internal volume of the separation section; a fluid discharge outlet in fluid communication with the internal volume at the first end; a particulate discharge outlet in fluid communication with the internal volume at the second end; and an inlet in fluid communication with the internal volume, wherein the inlet is disposed intermediate the first end and the second end.

2. The apparatus according to paragraph 1, wherein the inner metal surface comprises cobalt, chromium, tungsten, iron, manganese, molybdenum, vanadium, nickel, titanium, aluminum, copper, or any alloy thereof and optionally one or more of boron, carbon, silicon, phosphorus and sulfur.

3. The apparatus according to paragraphs 1 or 2, wherein the inner metal surface comprises a carburized metal, a boronized metal, a nitrided metal, or any combination thereof.

4. The apparatus according to any of paragraphs 1 to 3, wherein the inner metal surface is disposed on at least a first portion of the wall and wherein the thickness of the first portion with the inner metal wall disposed thereon is greater than the thickness of a second portion of the wall.

5. The apparatus according to any of paragraphs 1 to 4, wherein the inlet is tangentially disposed on the wall of the separation section.

6. The apparatus according to any of paragraphs 1 to 5, wherein the inner metal surface has a thermal conductivity of about 14 watts/m K or more.

7. The apparatus according to any of paragraphs 1 to 6, wherein the inner metal surface has a heat capacity of about 350 J/kg K or more.

8. The apparatus according to any of paragraphs 1 to 7, wherein the inner metal surface has a melting point of about 1,350° C. or more.

9. The apparatus according to any of paragraphs 1 to 8, wherein the inner metal surface has a Brinell hardness of about 200 or more.

10. The apparatus according to any of paragraphs 1 to 9, wherein the inner metal surface has a Charpy toughness of about 90 or more.

11. The apparatus according to any of paragraphs 1 to 10, wherein the separation section comprises a first section and a second section.

12. The apparatus according to paragraph 11, wherein the first section is cylindrical and the second section is frustoconical.

13. The apparatus according to any of paragraphs 1 to 12, wherein the inlet is in fluid communication with an outlet of a fluidized catalytic cracker.

14. A method for separating particulates from a carrier fluid, comprising introducing a particulate-fluid mixture into an inlet of a separator, the separator comprising a separation section having at least one wall, a first end, a second end and an inner metal surface that is exposed to an internal volume of the separation section; a fluid discharge outlet in fluid communication with the internal volume at the first end; a particulate discharge outlet in fluid communication with the internal volume at the second end; and an inlet in fluid communication with the internal volume, wherein the inlet is disposed intermediate the first end and the second end; separating the particulate-fluid mixture to provide a fluid product having a reduced particulate concentration relative to the particulate-fluid mixture and a particulate product; recovering the fluid product from the fluid discharge outlet; and recovering the particulate product from the particulate discharge outlet.

15. The method according to paragraph 14, wherein the inner metal surface comprises cobalt, chromium, tungsten, iron, manganese, molybdenum, vanadium, nickel, titanium, aluminum, copper, or any alloy thereof and optionally one or more of boron, carbon, silicon, phosphorus and sulfur.

16. The apparatus according to paragraphs 14 or 15, wherein the inner metal surface comprises a carburized metal, a boronized metal, a nitrided metal, or any combination thereof.

17. The method according to any of paragraphs 14 to 16, wherein the particulate-fluid mixture is at a temperature ranging from about 550° C. to about 750° C. during the separation of the particulate-fluid mixture.

18. The method according to any of paragraphs 14 to 17, wherein the inlet is tangentially disposed on the wall and the particulate-fluid mixture is tangentially introduced to the separator through the inlet.

19. The method according to any of paragraphs 14 to 18, wherein the particulate-fluid mixture is provided from a fluid catalytic cracking riser, wherein the particulates comprise coked catalyst particulates and the fluid comprises a reducing environment comprising one or more hydrocarbons.

20. The method according to paragraph 19, further comprising introducing the coked catalyst particulates to a regenerator to provide regenerated catalyst particulates after the recovering the particulate product step.

21. The method according to paragraph 20, further comprising after the recovering the particulate product step introducing a hydrocarbon and the regenerated catalyst particulates to the catalytic cracking riser; and cracking the hydrocarbon to provide the particulate-fluid mixture.

22. The method according to any of paragraphs 14 to 21, further comprising introducing the the fluid product to one or more separators to provide two or more separated fluid products, wherein the separated fluid products comprise methane, ethane, ethylene, propane, propylene, or any combination thereof.

23. A fluid catalytic cracking system, comprising a fluidized catalytic cracking riser having a product outlet in fluid communication with an inlet to a separator, wherein the separator comprises a separation section having at least one wall, a first end, a second end and an inner metal surface that is exposed to an internal volume of the separation section; a fluid discharge outlet in fluid communication with the internal volume at the first end; a particulate discharge outlet in fluid communication with the internal volume at the second end, wherein the inlet to the separator is in fluid communication with the internal volume, and wherein the inlet is disposed intermediate the first end and the second end; and a regenerator in fluid communication with the particulate discharge outlet.

24. The system according to paragraph 23, wherein the fluidized catalytic cracking riser is operated at a temperature of from about 550° C. to about 750° C.

25. The system according to paragraphs 23 or 24, wherein the inner metal surface comprises cobalt, chromium, tungsten, iron, manganese, molybdenum, vanadium, nickel, titanium, aluminum, copper, or any alloy thereof and optionally one or more of boron, carbon, silicon, phosphorus and sulfur.

26. The system according to any of paragraphs 23 to 25, wherein the inner metal surface comprises a carburized metal, a boronized metal, a nitrided metal, or any combination thereof.

27. The system according to any of paragraphs 23 to 26, wherein the separation section comprises a first section and a second section.

28. The system according to paragraph 27, wherein the first section is cylindrical and the second section is frustoconical.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art. It is assumed that the sum of all percents (whether weight, volume, mol or otherwise) of components of a single stream equal 100% unless otherwise stated. References to volume percent with respect to portions of a stream that may be recycled within an apparatus or process are based on the total volume of material introduced into the line in question.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An apparatus for separating particulates from a fluid, comprising:
   a separation section having at least one wall, a first end, a second end and an inner metal surface exposed to an internal volume of the separation section, wherein the inner metal surface comprises a carburized metal, a boronized metal, a nitrided metal, or any combination thereof;
   a fluid discharge outlet in fluid communication with the internal volume at the first end;
   a particulate discharge outlet in fluid communication with the internal volume at the second end; and
   an inlet in fluid communication with the internal volume, wherein the inlet is disposed intermediate the first end and the second end;
   and wherein the inlet is adapted to create a vortex along the inner metal surface.

2. The apparatus of claim 1, wherein the inner metal surface comprises cobalt, chromium, tungsten, iron, manganese, molybdenum, vanadium, nickel, titanium, aluminum, copper, or any alloy thereof and optionally one or more of boron, carbon, silicon, phosphorus and sulfur.

3. The apparatus of claim 1, wherein the inner metal surface is disposed on at least a first portion of the wall and wherein the thickness of the first portion with the inner metal wall disposed thereon is greater than the thickness of a second portion of the wall.

4. The apparatus of claim 1, wherein the inlet is tangentially disposed on the wall of the separation section with respect to the inner metal surface.

5. The apparatus of claim 1, wherein the inner metal surface has a thermal conductivity of about 14 watts/m K or more.

6. The apparatus of claim 1, wherein the inner metal surface has a heat capacity of about 350 J/kg K or more.

7. The apparatus of claim 1, wherein the inner metal surface has a melting point of about 1,350° C. or more.

8. The apparatus of claim 1, wherein the inner metal surface has a Brinell hardness of about 200 or more.

9. The apparatus of claim 1, wherein the inner metal surface has a Charpy toughness of about 90 or more.

10. The apparatus of claim 1, wherein the separation section comprises a first section and a second section.

11. The apparatus of claim 10, wherein the first section is cylindrical and the second section is frustoconical.

12. The apparatus of claim 1, wherein the inlet is in fluid communication with an outlet of a fluidized catalytic cracker.

13. A method for separating particulates from a carrier fluid, comprising:
   introducing a particulate-fluid mixture into an inlet of a separator, the separator comprising:
      a separation section having at least one wall, a first end, a second end and an inner metal surface that is exposed to an internal volume of the separation section;
      a fluid discharge outlet in fluid communication with the internal volume at the first end;
      a particulate discharge outlet in fluid communication with the internal volume at the second end; and
      an inlet in fluid communication with the internal volume, wherein the inlet is disposed intermediate the first end and the second end, and wherein the inlet is adapted to create a vortex along the inner metal surface;
   separating the particulate-fluid mixture to provide a fluid product having a reduced particulate concentration relative to the particulate-fluid mixture and a particulate product;
   recovering the fluid product from the fluid discharge outlet; and
   recovering the particulate product from the particulate discharge outlet.

14. The method of claim 13, wherein the inner metal surface comprises cobalt, chromium, tungsten, iron, manganese, molybdenum, vanadium, nickel, titanium, aluminum, copper, or any alloy thereof and optionally one or more of boron, carbon, silicon, phosphorus and sulfur.

15. The apparatus of claim 13, wherein the inner metal surface comprises a carburized metal, a boronized metal, a nitrided metal, or any combination thereof.

16. The method of claim 13, wherein the particulate-fluid mixture is at a temperature ranging from about 550° C. to about 750° C. during the separation of the particulate-fluid mixture.

17. The method of claim 13, wherein the inlet is tangentially disposed on the wall of the separation section with respect to the inner metal surface and the particulate-fluid mixture is tangentially introduced to the separator with respect to the inner metal surface through the inlet.

18. The method of claim 13, wherein the particulate-fluid mixture is provided from a fluid catalytic cracking riser, wherein the particulates comprise coked catalyst particulates and the fluid comprises a reducing environment comprising one or more hydrocarbons.

19. The method of claim 18, further comprising introducing the coked catalyst particulates to a regenerator to provide regenerated catalyst particulates after the recovering the particulate product step.

20. The method of claim 19, further comprising after the recovering the particulate product step:
   introducing a hydrocarbon and the regenerated catalyst particulates to the catalytic cracking riser; and
   cracking the hydrocarbon to provide the particulate-fluid mixture.

21. The method of claim 13, further comprising introducing the fluid product to one or more separators to provide two or more separated fluid products, wherein the separated fluid products comprise methane, ethane, ethylene, propane, propylene, or any combination thereof.

22. A fluid catalytic cracking system, comprising:
   a fluidized catalytic cracking riser having a product outlet in fluid communication with an inlet to a separator, wherein the separator comprises:
      a separation section having at least one wall, a first end, a second end and an inner metal surface that is exposed to an internal volume of the separation section, wherein the inner metal surface comprises a carburized metal, a boronized metal, a nitrided metal, or any combination thereof;
      a fluid discharge outlet in fluid communication with the internal volume at the first end;
      a particulate discharge outlet in fluid communication with the internal volume at the second end, wherein the inlet to the separator is in fluid communication with the internal volume, and wherein the inlet is disposed intermediate the first end and the second end; and
   a regenerator in fluid communication with the particulate discharge outlet;
   and wherein the inlet is adapted to create a vortex along the inner metal surface.

23. The system of claim 22, wherein the fluidized catalytic cracking riser is operated at a temperature of from about 550° C. to about 750° C.

24. The system of claim 22, wherein the inner metal surface comprises cobalt, chromium, tungsten, iron, manganese, molybdenum, vanadium, nickel, titanium, aluminum, copper, or any alloy thereof and optionally one or more of boron, carbon, silicon, phosphorus and sulfur.

25. The system of claim 22, wherein the separation section comprises a first section and a second section.

26. The system of claim 25, wherein the first section is cylindrical and the second section is frustoconical.

* * * * *